United States Patent
Ma et al.

(10) Patent No.: US 9,377,316 B2
(45) Date of Patent: Jun. 28, 2016

(54) METHOD AND DEVICE FOR PROVIDING LOCATION SERVICES

(71) Applicant: Tencent Technology (Shenzhen) Company Limited, Shenzhen (CN)

(72) Inventors: Huafeng Ma, Shenzhen (CN); Juan Li, Shenzhen (CN); Shaobo Yang, Shenzhen (CN); Nanjiang Liu, Shenzhen (CN); Man Liu, Shenzhen (CN); Jin Lin, Shenzhen (CN); Xiaodong Ma, Shenzhen (CN); Fangjian Zhan, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 14/615,342

(22) Filed: Feb. 5, 2015

(65) Prior Publication Data

US 2015/0153191 A1    Jun. 4, 2015

Related U.S. Application Data

(63) Continuation of application No. PCT/CN2014/083778, filed on Aug. 6, 2014.

(30) Foreign Application Priority Data

Sep. 18, 2013 (CN) .......................... 2013 1 0430953

(51) Int. Cl.
*G01C 21/30* (2006.01)
*G01C 21/34* (2006.01)
(Continued)

(52) U.S. Cl.
CPC ................ *G01C 21/34* (2013.01); *G01C 21/20* (2013.01); *G01C 21/3644* (2013.01); *G01C 21/3679* (2013.01); *H04W 4/026* (2013.01)

(58) Field of Classification Search
CPC .... G01C 21/34; G01C 21/20; G01C 21/3644; G01C 21/3679; G01C 21/3682; H04W 4/026
See application file for complete search history.

(56) References Cited

U.S. PATENT DOCUMENTS 8,239,130 B1 *    8/2012    Upstill ............... G01C 21/3679
                                                                  701/400
9,063,951 B1 *    6/2015    Zhu .................... G06F 17/30241
(Continued)

FOREIGN PATENT DOCUMENTS

CN          101702165 A      5/2010
CN          101852617 A     10/2010
(Continued)

OTHER PUBLICATIONS

Tencent Technology, ISRWO, PCT/CN2014/083778, Nov. 13, 2014, 7 pgs.

*Primary Examiner* — Michael J Zanelli
(74) *Attorney, Agent, or Firm* — Morgan, Lewis & Bockius LLP

(57) ABSTRACT

A method and apparatus for providing a location service are disclosed. The method is performed at a mobile device having one or more processors and memory for storing programs to be executed by the one or more processors. The method includes storing respective geographic positions for a set of points of interest (POIs). The method includes determining a current location and a current viewing direction of a user while storing the respective geographic positions of the set of POIs. The method also includes identifying, based on the stored geographic positions and the current location and viewing direction of the user, a subset of POIs within a current field of view associated with the user from the set of POIs. The method further includes mapping the current location of the user and the respective geographic positions of the subset of POIs onto a user interface displayed on the mobile device.

19 Claims, 14 Drawing Sheets

(51) Int. Cl.
*H04W 4/02* (2009.01)
*G01C 21/36* (2006.01)
*G01C 21/20* (2006.01)

(56) References Cited

U.S. PATENT DOCUMENTS

| | | | |
|---|---|---|---|
| 2007/0219706 A1* | 9/2007 | Sheynblat | G01C 21/3679 701/532 |
| 2009/0319348 A1* | 12/2009 | Khosravy | G01C 21/20 705/14.1 |
| 2014/0240350 A1* | 8/2014 | Chen | G09G 5/14 345/633 |
| 2015/0049080 A1* | 2/2015 | Purayil | H04L 67/2847 345/419 |

FOREIGN PATENT DOCUMENTS

| | | |
|---|---|---|
| CN | 102081572 A | 6/2011 |
| CN | 202043177 U | 11/2011 |
| TW | 201221912 A | 6/2012 |
| TW | 201248123 A | 12/2012 |
| WO | WO 2012089280 A1 | 7/2012 |

* cited by examiner

METHOD AND DEVICE FOR PROVIDING LOCATION SERVICES

PRIORITY CLAIM AND RELATED APPLICATION

This application is a continuation application of PCT Patent Application No. PCT/CN2014/083778, entitled "METHOD AND DEVICE FOR PROVIDING LOCATION SERVICES" filed on Aug. 6, 2014, which claims priority to Chinese Patent Application Serial No. 201310430953.7, entitled "METHOD AND APPARATUS FOR PROVIDING LOCATION SERVICES", filed on Sep. 18, 2013, both of which are incorporated herein by reference in their entirety.

TECHNICAL FIELD

The present application generally relates to the field of mobile Internet technologies, and more particularly to a method and related apparatus for providing location and navigation services.

BACKGROUND

Some known location services enable a user to download an electronic map and browse the map to acquire the user's current location and geographic information of the surrounding environment. For example, a user can acquire information of at which street she is currently located through the current location identified in the electronic map. The user can also acquire information about markets and/or hotels surrounding her current location based on places identified on the electronic map. For another example, for a user sightseeing within a scenic area, locating and navigation in the scenic area can be achieved through loading an electronic map onto a mobile device of the user. The known location services, however, typically do not detect a current direction of a user, thus are not enabled to provide a more accurate navigation based on the user's current direction.

Therefore, a need exists for a method and apparatus that can provide a location service that detects a user's direction and enables an accurate navigation based on the user's direction.

SUMMARY

The above deficiencies associated with the known location services may be addressed by the techniques described herein.

In some embodiments, a method for providing navigation assistance is performed at a mobile device having one or more processors and memory for storing programs to be executed by the one or more processors. The method includes storing respective geographic positions for a set of points of interest (POIs). In some instances, the method includes retrieving, from a server device, the respective geographic positions for the set of POIs prior to determining the current location and the current viewing direction of the user. In some instances, the respective geographic positions for the set of POIs can be retrieved from the server device in textual form without any accompanying map image.

The method includes determining a current location and a current viewing direction of a user while the respective geographic positions of the set of POIs have been stored locally at the mobile device. The method also includes identifying, based on the stored geographic positions and the current location and viewing direction of the user, a subset of POIs within a current field of view associated with the user from the set of POIs. In some instances, the identifying includes (1) obtaining an angular range for the user's current field of view based at least in part on the current location and the current viewing direction of the user; (2) calculating a respective azimuth angle for each POI in the set of POIs based on the current location of the user and the respective geographic position of the POI; and (3) determining, based at least in part on the respective azimuth angle of the POI, whether that POI is within the user's current field of view.

The method further includes mapping the current location of the user and the respective geographic positions of the subset of POIs onto a user interface displayed on the mobile device. In some instances, the mapping includes mapping each POI from the subset of POIs to a respective position on the user interface based at least in part on the current location of the user, the respective geographic position of the POI, and a maximum distance between two POIs from the subset of POIs. In some other instances, the mapping includes calculating, based on the respective geographic position of each POI from the subset of POIs and the current location of the user, a respective vertical pixel offset and a respective horizontal pixel offset between a symbol representing said each POI displayed on the user interface and a symbol representing the user displayed on the user interface. In yet some other instances, the mapping includes presenting respective symbols for the subset of POIs and a respective symbol for the user on a map displayed on the mobile device. In such instances, a relative distance between the respective symbol for each POI from the subset of POIs and the respective symbol for the user shown on the map can be based at least on the respective geographic position of that POI and the current location of the user. Additionally, the relative distance between the respective symbol for each POI from the subset of POIs and the respective symbol for the user shown on the map can be further based at least on an aspect ratio of a display pixel of the mobile device.

In some embodiments, a mobile device includes one or more processors and memory storing one or more programs for execution by the one or more processors. The one or more programs include instructions that cause the mobile device to perform the method for providing navigation assistance as described above. In some embodiments, a non-transitory computer readable storage medium stores one or more programs including instructions for execution by one or more processors. The instructions, when executed by the one or more processors, cause the processors to perform the method for providing navigation assistance at a mobile device as described above.

Various advantages of the present application are apparent in light of the descriptions below.

BRIEF DESCRIPTION OF DRAWINGS

The aforementioned implementation of the present application as well as additional implementations will be more clearly understood as a result of the following detailed description of the various aspects of the present application when taken in conjunction with the drawings.

Like reference numerals refer to corresponding parts throughout the several views of the drawings.

DETAILED DESCRIPTION

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

In order to make the objectives, technical solutions, and advantages of the present application comprehensible, embodiments of the present application are further described in detail below with reference to the accompanying drawings.

Figure 1:
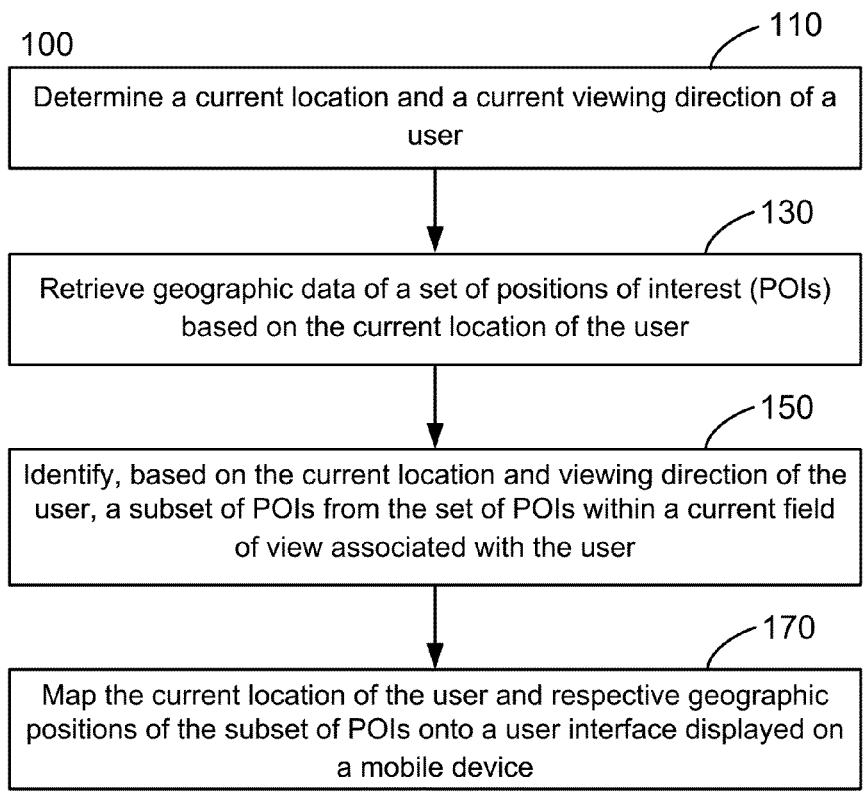
FIG. 1 is a flow chart illustrating a method performed at a mobile device for providing a location service in accordance with some embodiments.

FIG. 1 is a flow chart illustrating a method 100 performed at a mobile device for providing a location service in accordance with some embodiments. The mobile device performing the method 100 can be any type of portable, electronic device that can be carried and/or moved by a user. Such a mobile device can be configured to communicate with one or more server device(s) via one or more network(s). The mobile device can be configured to interact with the user operating the mobile device to provide location and/or navigation services to the user. In some embodiments, the mobile device can be, for example, a cellular phone, a smart phone, a mobile Internet device (MID), a personal digital assistant (PDA), a tablet computer, an e-book reader, a laptop computer, a handheld computer, a wearable device, a MP3 player (Moving Picture Experts Group Audio Layer III), a MP4 player (Moving Picture Experts Group Audio Layer IV), and/or any other electronic device. In some embodiments, a mobile device can be referred to as, for example, a client device, a user device, a terminal, a portable device, and/or the like.

A server device communicating with the mobile device performing the method 100 can be any type of device configured to function as a server-side device to provide the location and/or navigation services described herein. Such a server device can typically be configured to communicate with multiple mobile devices via one or more networks. In some embodiments, a server device can be, for example, a background server, a back end server, a database server, a workstation, a desktop computer, a cloud computing server, a data processing server, and/or the like. In some embodiments, a server device can be a server cluster or server center consisting of two or more servers (e.g., a data processing server and a database server).

A network connecting a mobile device and a server device can be any type of network configured to operatively couple one or more server devices to one or more mobile devices, and enable communications between the server device(s) and the mobile device(s). In some embodiments, such a network can include one or more networks such as, for example, a cellular network, a satellite network, a local area network (LAN), a wide area network (WAN), a wireless local area network (WLAN), Internet, etc. In some embodiments, such a network can be optionally implemented using any known network protocol including various wired and/or wireless protocols such as, for example, Ethernet, universal serial bus (USB), global system for mobile communications (GSM), enhanced data GSM environment (EDGE), general packet radio service (GPRS), long term evolution (LTE), code division multiple access (CDMA), wideband code division multiple Access (WCDMA), time division multiple access (TDMA), Bluetooth, Wi-Fi, voice over internet protocol (VoIP), Wi-MAX, etc.

A user operating the mobile device performing the method 100 can be any person (potentially) interested in receiving the location and/or navigation service(s) provided by the mobile device. Such a person can be, for example, a tourist, a visitor, a pedestrian, a policeman, a tour guide, a driver, a person riding a transportation (e.g., a bus, a train), and/or any other person that needs a location and/or navigation service.

In some embodiments, the mobile device performing the method 100 can include one or more processors and memory. In such embodiments, the method 100 is governed by instructions or code of an application that are stored in a non-transitory computer readable storage medium of the mobile device and executed by the one or more processors of the mobile device. The application is associated with providing a location and/or navigation service, and has a server-side portion that is stored in and/or executed at the server device, and a client-side portion that is stored in and/or executed at the mobile device. As a result of the client-side portion of the application being executed, the method 100 is performed to provide the location and/or navigation service to the user operating the mobile device.

In some embodiments, the method 100 is associated with an application for providing a location and/or navigation service to the user of the mobile device. In such embodiments, the application has a server-side portion stored in and/or executed at the server device, and a client-side portion stored in and/or executed at the mobile device. Moreover, the method 100 is governed by instructions or code of the client-side portion of the application that are stored in a non-transitory computer readable storage medium of the mobile device and executed by the one or more processors of the mobile device. As shown in FIG. 1, the method 100 includes the following steps.

At 110, a current location and a current viewing direction of the user are determined at the mobile device. In some embodiments, for example, the current location of the user can be obtained via a current location of the mobile device, and the current viewing direction of the user can be determined based on a direction of the mobile device (i.e., the direction to which the mobile device is pointed). In some embodiments, the current location of the mobile device can be represented by, for example, coordinates (e.g., longitude coordinate, latitude coordinate) of the mobile device, relative location information of the mobile device with respect to a reference location (e.g., 100 meters north of a gate of a park, 1 kilometer east of a scenic spot), or in any other suitable format. Similarly, the current viewing direction of the user (e.g., the direction of the mobile device) can be represented by, for example, a magnetic north angle of the mobile device, relative direction information of the mobile device with respect to a reference direction (e.g., a 30-degree clockwise angle from the east line, a 45-degree counterclockwise angle from a base line connecting the mobile device and a reference point), or in any other suitable format. Particularly, the magnetic north angle of the mobile device represents an angle of the mobile device (e.g., a direction to which the mobile device is pointed) deviated counterclockwise from the magnetic north. Thus, such a magnetic north angle can be measured by, for example, a compass.

In some embodiments, the current location and direction of the mobile device can be obtained by, for example, a global positioning system (GPS) embedded within the mobile device, a compass implemented within the mobile device, and/or any other suitable hardware or terminal device associated with the mobile device. In such embodiments, for example, the mobile device can be configured to invoke an interface function supported by HTML5 to acquire the current location of the mobile device, and determine the magnetic north angle of the mobile device by monitoring the rotation movement of the mobile device. Such an interface function can be, for example, getCurrentPosition. The monitoring operation can be performed by, for example, an HTML 5 device orientation application.

At 130, geographic data of a set of POIs is retrieved at the mobile device based on the current location of the user. In some embodiments, the mobile device can be configured to send a request for geographic data to the server device communicating with the mobile device. The request for geographic data can include information of the current location. In response to receiving such a request, the server device can send geographic data of a set of POIs associated with (e.g., surrounding) the current location to the mobile device. In some embodiments, the set of POIs can be distributed in an area of interest covering the current location. Such an area of interest can be, for example, a predefined area with an existing or established boundary (e.g., a park, a shopping mall, a building, a city, etc.), or an area defined based on the current location of the user (e.g., a circle with a predefined radius and centered at the current location of the user). For example, the set of POIs can be a collection of scenic spots in a circle with a predefined radius and centered at the current location of the user. For another example, the set of POIs can be a group of shops in a shopping mall that covers the current location of the user. For yet another example, the set of POIs can be a group of restaurants in a district covering the current location of the user. In some embodiments, the mobile device can be configured to retrieve geographic data of the set of POIs from one or more than one server devices.

The geographic data of the set of POIs retrieved from the server device can include geographic position information for each POI from the set of POIs. For example, the geographic data of a POI can include coordinates (e.g., longitude coordinate, latitude coordinate) for the location of that POI. In some embodiments, the geographic position of a POI can be represented in any other suitable form. In some embodiments, the geographic data of the set of POIs can include entity information data for the set of POIs. Such entity information data for a POI can include, for example, a name, an identification, a (unique) symbol, guide information, navigation information, a category, etc., for that POI. For example, the geographic data of the White House (e.g., as a scenic spot) can include geographic position of the White House (38.8977° N, 77.0366° W) and entity information data of the White House such as, for example, a name (the White House), an address (1600 Pennsylvania Avenue NW, Washington, D.C.), a brief description ("the White House is the official residence and principal workplace of the President of the United States"), an image symbol or icon, etc., for the White House.

In some embodiments, the mobile device can be configured to retrieve the geographic data of the set of POIs in textual form without any accompanying map image. That is, the geographic data (including geographic position information and entity information data) of the set of POIs is transmitted from the server device to the mobile device in textual form without any image (e.g., a map covering the set of POIs) being transmitted from the server device to the mobile device. In such embodiments, data transmission from the server device to the mobile device is reduced to a low level, thus reducing consumption on the network bandwidth.

In some embodiments, the mobile device can be configured to store the retrieved geographic data of the set of POIs at, for example, a memory of the mobile device. Thus, the geographic data of the set of POIs is locally cached at the mobile device. In such embodiments, the mobile device is configured to retrieve geographic data of a certain set of POIs from the server device when the mobile device requests for that geographic data for the first time. The mobile device is then configured to store the retrieved geographic data at a local storage device or medium, such as in a flash memory, or disk. As a result, in response to any subsequent request, the mobile device is configured to retrieve, from the local memory, the geographic data of the same set of POIs or any POI from that set of POIs without retrieving the geographic data from the server device again.

In some embodiments, as shown and described above with respect to steps 110, 130, the geographic data of the set of POIs can be retrieved based on the current location of the user. Alternatively, in some other embodiments (not shown in FIG. 1), the mobile device can be configured to retrieve geographic data of a set of POIs without providing a current location of the user to the server. The mobile device can be configured to store the retrieved geographic data at a local storage device or medium, e.g., a flash memory or disk. In such embodiments, for example, the user can operate the mobile device to download geographic data of a set of POIs within a target area (e.g., an area of interest) without providing a current location of the user or the mobile device. Specifically, the user can enter information of the target area into the mobile device, and then trigger the mobile device to send to the server device a request for geographic data including the information of the target area. In such a process, the mobile device does not invoke any embedded positioning module (e.g., a GPS) to determine a current location and provide that information to the server device. For example, before traveling to a scenic area, the user downloads geographic data of scenic sports in the scenic area into the mobile device. In such embodiments, the mobile device can be configured to retrieving, from a server device, geographic data for a set of POIs prior to determining a current location and viewing direction of the user. Additionally, the mobile device can be configured to determine a current location and viewing direction of the user while storing the geographic data of the set of POIs.

At 150, a subset of POIs within a current field of view associated with the user can be identified from the set of POIs based on the current location and viewing direction of the user. The current field of view associated with the user can be determined based at least in part on the current location and viewing direction of the user. In some embodiments, for example, the current field of view associated with the user can be defined as a circular sector with a predefined radius and angle, where the current location of the user is the origin of the circle and the current viewing direction of the user is the angular bisector of the angle. The mobile device can be configured to identify, based on the geographic data (e.g., geographic position information) of the set of POIs, a subset of POIs that are within the defined current field of view associated with the user. In other embodiments, the current field of view associated with the user can be defined in any other suitable method based on the current location of the user, the current viewing direction of the user, and/or any predefined parameter.

For example, the current field of view associated with the user can be defined as a circular sector with a radius of 1 kilometer and an angle of 120 degrees, where the circle is centered at the current location of the user and the current viewing direction of the user (assuming it is east) is the angular bisector for the 120-degree angle of the circular sector. As a result, a POI at 0.5 kilometer east to the current location of the user and a POI at 0.9 kilometer northeast (i.e., having a 45-degree angle from east) to the current location of the user are within the defined circular sector, while a POI at 1.5 kilometer east to the current location of the user and a POI at 0.6 kilometer north to the current location of the user are not within the defined circular sector. Details of identifying a subset of POIs within the current field of view associated with the user are further shown and described with respect to FIGS. 2-7.

At 170, the current location of the user and respective geographic positions of the subset of POIs can be mapped onto a user interface displayed on the mobile device. Such a user interface can be, for example, a screen or any other suitable display device of the mobile device viewable to the user. In some embodiments, in response to identifying the subset of POIs, the mobile device can be configured to present respective symbols for the subset of POIs and a respective symbol for the user (i.e., the current location of the user) on a map displayed on the user interface of the mobile device. In such embodiments, a relative distance between the respective symbol for each POI from the subset of POIs and the respective symbol for the user shown on the map can be based at least on the respective geographic position of that POI and the current location of the user. Furthermore, the respective symbol for each POI from the subset of POI displayed on the map can include entity information data for that POI such as, for example, a name, a description, guide information, navigation information, and/or the like.

For example, in response to identifying a subset of scenic spots within a field of view associated with the user, the mobile device can map the current location of the user and the respective geographic position of each scenic spot from the subset of scenic spots onto a map displayed at the screen of the mobile device. Specifically, a symbol representing the user (or the mobile device) can be displayed at a position on the map that maps to the current location of the user, and a respective symbol representing each scenic spot can be displayed at a respective position on the map that maps to the respective geographic position of that scenic spot. Additionally, the respective symbol for each scenic spot includes a name (e.g., "the White House"), a description (e.g., "the official residence and principal workplace of the President of the United States"), an address (e.g., "1600 Pennsylvania Avenue NW, Washington, D.C."), navigation information (e.g., "2 blocks east of my current location", "2.8 miles"), an image, and/or the like. Details of displaying symbols for the POIs and the current location of the user on the mobile device are further shown and described with respect to FIGS. 8-12.

Figure 2:
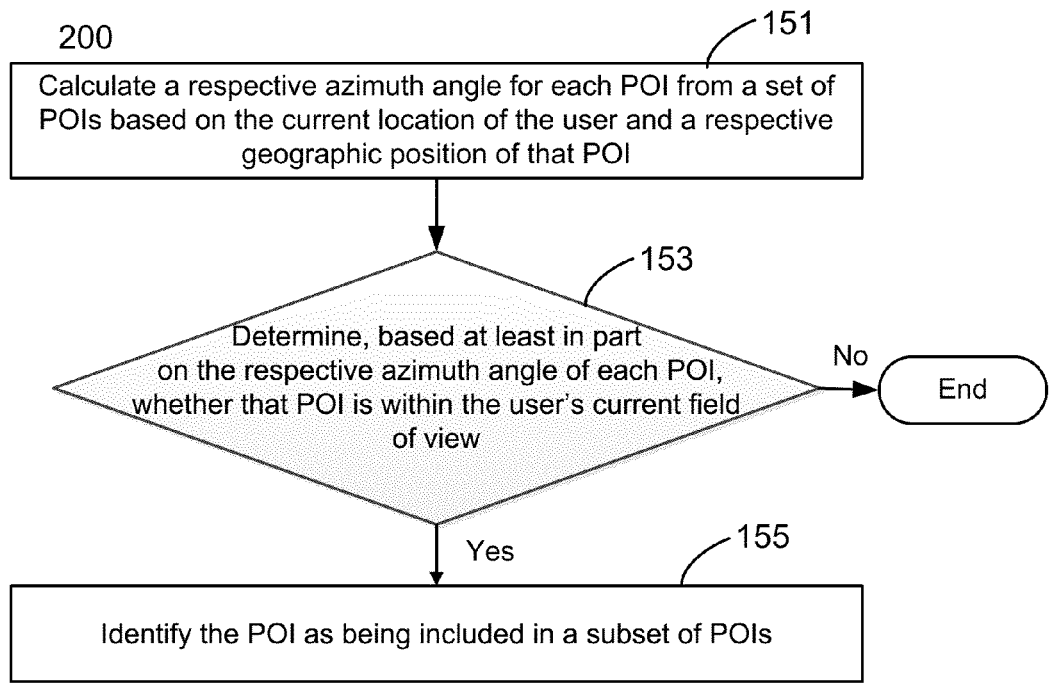
FIG. 2 is a flow chart illustrating a method performed at a mobile device for identifying a subset of positions of interest (POIs) in accordance with some embodiments.

FIG. 2 is a flow chart illustrating a method 200 performed at a mobile device for identifying a subset of POIs in accordance with some embodiments. As described herein, symbols for the identified subset of POIs can be displayed on a user interface of the mobile device. The mobile device performing the method 200 can be similar to the mobile device performing the method 100 as described above. The method 200 can be an implementation for the step 150 of the method 100 shown and described above with respect to FIG. 1. In some other embodiments, although not shown and described herein, a mobile device can be configured to identify a subset of POIs using any other suitable method.

Specifically, at 151, the mobile device calculates a respective azimuth angle for each POI from a set of POIs based on the current location of the user and a respective geographic position of that POI. The azimuth angle for a POI is an angle (measured clockwise) between the due north direction (i.e., magnetic north) and a line connecting the POI and the current location of the user (i.e., the mobile device). That is, in a coordinate system using the user's current location as the origin and the due north direction as the vertical coordinate, the azimuth angle for a POI is the angle covered by the positive axis of the vertical coordinate rotating clockwise to the line connecting the POI and the current location of the user (i.e., the origin of the coordinate system).

Figure 3:
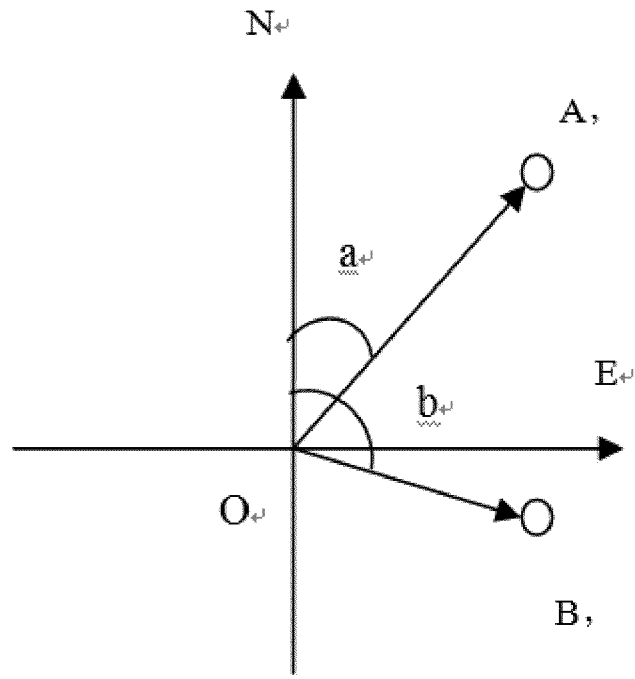
FIG. 3 is a schematic diagram illustrating azimuth angles for POIs in accordance with some embodiments.

FIG. 3 is a schematic diagram illustrating azimuth angles for POIs A and B in accordance with some embodiments. As shown in FIG. 3, O (the origin of the coordinate system) is the current location of the user, and the direction ON (the positive axis of the vertical coordinate) is the due north direction. As a result, the angle NOA (i.e., angle "a") is the azimuth angle for the POI A, and the angle NOB (i.e., angle "b") is the azimuth angle for the POI B.

At 153, the mobile device determines, based at least in part on the respective azimuth angle of each POI from the set of POIs, whether that POI is within the user's current field of view. The user's current field of view is determined based at least on the current viewing direction of the user and a predefined angle for the field of view. Particularly, the mobile device can be configured to obtain an angular range for the user's current field of view based on the current location and the current viewing direction of the user, the predefined angle for the field of view, and/or other parameter.

As described above with respect to the step 110 of the method 100, the current viewing direction of the user can be represented by, for example, a magnetic north angle for the viewing direction, which can be measured by a compass. The magnetic north angle for a viewing direction is defined as an angle of the mobile device (e.g., a direction to which the mobile device is pointed) deviated counterclockwise from the magnetic north. That is, in a coordinate system using the user's current location as the origin and the due north direction as the vertical coordinate, the magnetic north angle for a viewing direction is the angle covered by the positive axis of the vertical coordinate rotating counterclockwise to the line representing the viewing direction. Thus, when the current viewing direction of the mobile device is the due north direction, the magnetic north angle for the viewing direction is 0 degree, and with the rotation of the mobile device, the magnetic north angle for the viewing direction can vary in a range from 0 degree to 360 degrees.

Figure 4:
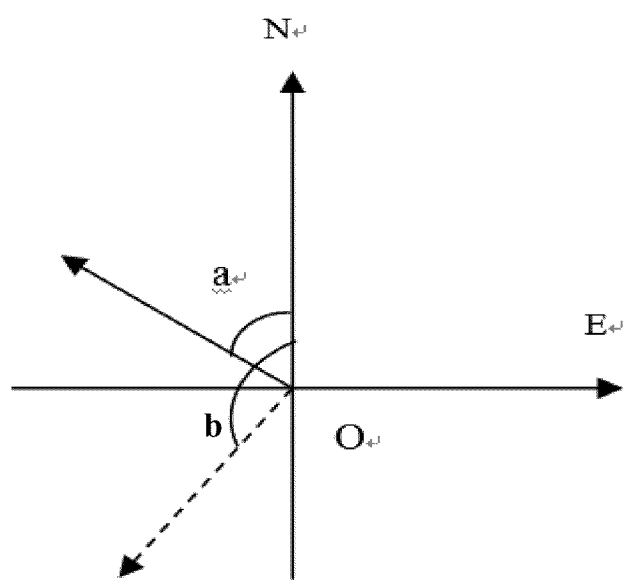
FIG. 4 is a schematic diagram illustrating magnetic north angles for current viewing directions of a user in accordance with some embodiments.

FIG. 4 is a schematic diagram illustrating magnetic north angles for current viewing directions of a user in accordance with some embodiments. As shown in FIG. 4, O (the origin of the coordinate system) is the current location of the user, and the direction ON (the positive axis of the vertical coordinate) is the due north direction. The angle "a" is the magnetic north angle for a viewing direction represented by the solid arrowed-line; and the angle "b" is the magnetic north angle for another viewing direction represented by the dotted arrowed-line.

In some embodiments, the user's current field of view can be determined based on, for example, the magnetic north angle for the current viewing direction of the user, a predefined angle for the field of view, and/or a predefined range for the field of view. For example, as described above with respect to the step 150 of the method 100, the user's current field of view can be defined as a circular sector with a predefined radius (i.e., predefined range for the field of view) and angle (i.e., predefined angle for the field of view), where the current location of the user is the origin of the circle and the current viewing direction of the user (represented by the magnetic north angle) is the angular bisector of the angle.

In some embodiments, the user's current field of view can be determined based on the current viewing direction of the user and a predefined angle for the field of view, without limiting the range for the field of view. In such embodiments, the range for the field of view can be considered as unlimited. As a result, the mobile device can determine whether a POI is within the user's current field of view based on the respective azimuth angle of that POI and the angular range for the user's current field of view.

Figure 5:
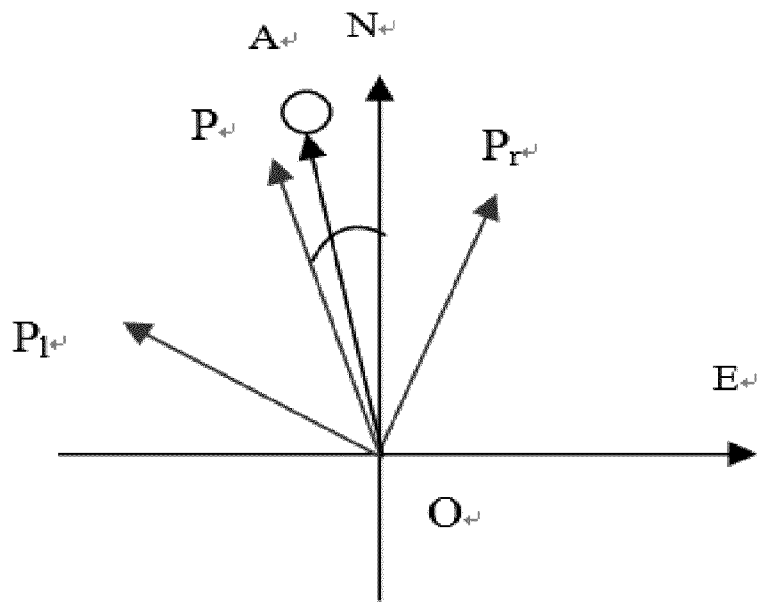
FIGS. 5-7 are schematic diagrams illustrating various scenarios for a user's current field of view in accordance with some embodiments.
Figure 6:
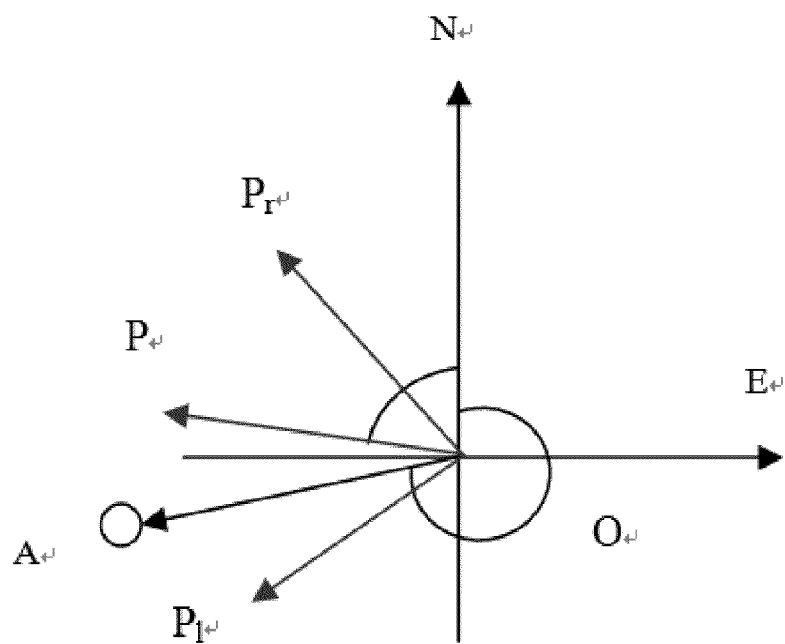
Figure 7:
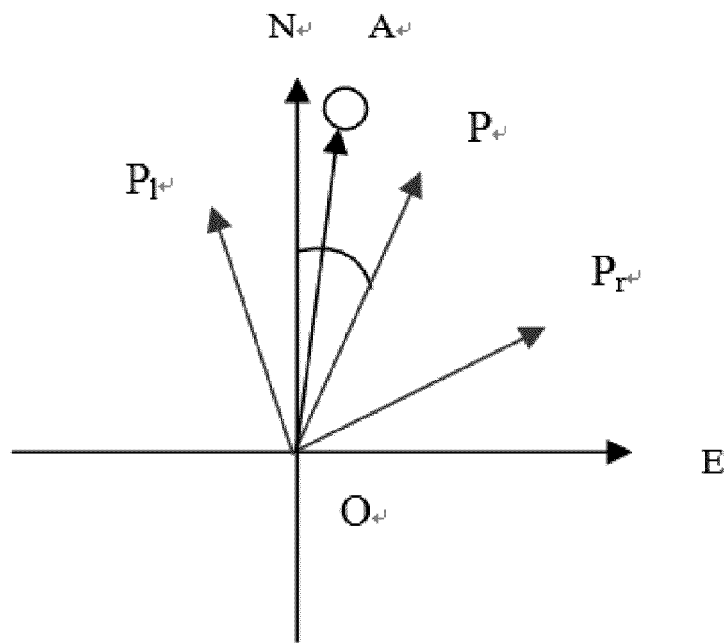

FIGS. 5-7 are schematic diagrams, each of which illustrates a different scenario for making such a determination in accordance with some embodiments. In the descriptions for FIGS. 5-7 and subsequent figures, "v" represents the predefined angle for the field of view (e.g., the angle $P_lOP_r$ in FIGS. 5-7). As shown in FIGS. 5-7, the direction OP is the current viewing direction. Thus, the angle NOP is the magnetic north angle for the current viewing direction. The current field of view is defined by the angle $P_lOP_r$ (having a value "v"), where the ray OP is the angular bisector for the angle $P_lOP_r$. In other words, the angular range for the user's current field of view includes every angle between the angle $NOP_l$ and the angle $NOP_r$. The angle NOA is the azimuth angle for the POI A. If the ray OA falls within the current field of view defined by the angle $P_lOP_r$, then the POI A is determined to be within the current field of view.

FIG. 5 is a schematic diagram illustrating a user's current field of view in accordance with some embodiments. Specifically, FIG. 5 illustrates a first scenario when the magnetic north angle NOP $\in [0, v/2)$. In such a scenario, when the ray OA fall within NOP$^l$ or falls within NOP$_r$, then the POI A is determined to be within the current field of view of the user. In other words, if NOA $\in [360-v/2-NOP, 360)$ or NOA $\in [0, v/2-NOP)$, then the POI A is determined to be within the current field of view of the user.

FIG. 6 is a schematic diagram illustrating a user's current field of view in accordance with some other embodiments. Specifically, FIG. 6 illustrates a second scenario when the magnetic north angle NOP $\in [v/2, 360-v/2)$. In such a scenario, when the ray OA falls within $P_rOP_l$, then the POI A is determined to be within the current field of view of the user. In other words, if NOA $\in [360-NOP-v/2, 360-NOP+v/2)$, then the POI A is determined to be within the current field of view of the user.

FIG. 7 is a schematic diagram illustrating a user's current field of view in accordance with yet some other embodiments. Specifically, FIG. 7 illustrates a third scenario when the magnetic north angle NOP $\in [360-v/2, 360)$. In such a scenario, when the ray OA fall within $P_lON$ or falls within NOP$_r$, then the POI A is determined to be within the current field of view of the user. In other words, if NOA $\in [360-(v/2-360-NOP), 360)$ or NOA $\in [0, v/2+360-NOP)$, then the POI A is determined to be within the current field of view of the user.

Returning to FIG. 2, if a POI from the set of POIs is not within the user's current field of view, then the operation on that POI is ended. In other words, that POI is not identified as being included in the subset of POIs, thus not presented to the user on the user interface of the mobile device. Otherwise, if a POI from the set of POIs is within the user's current field of view, at 155, then that POI is identified as being included in the subset of POIs, thus presented to the user on the user interface of the mobile device.

Figure 8:
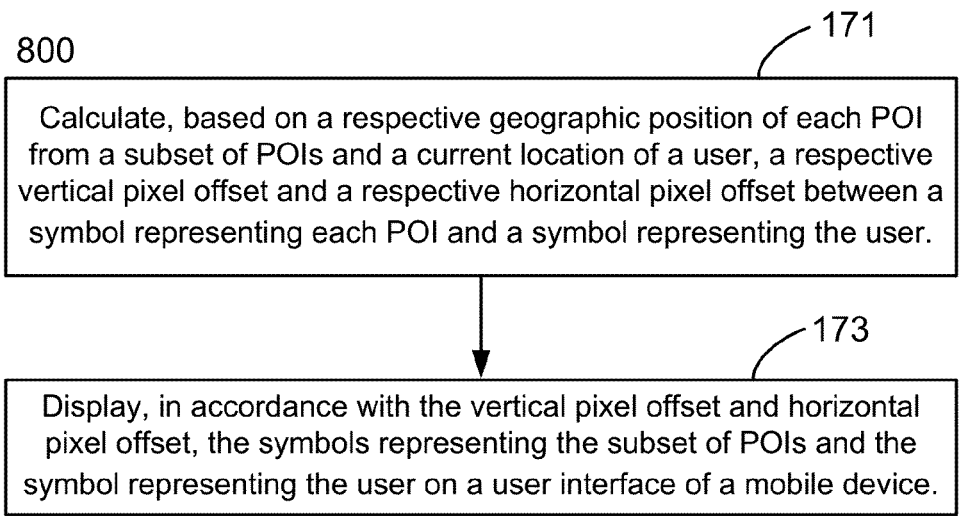
FIG. 8 is a flow chart illustrating a method performed at a mobile device for displaying symbols representing POIs and a user on a user interface of a mobile device in accordance with some embodiments.

FIG. 8 is a flow chart illustrating a method 800 performed at a mobile device for displaying symbols representing POIs and a user on a user interface of a mobile device in accordance with some embodiments. The mobile device performing the method 800 can be similar to the mobile device performing the method 100 as described above. The user interface can be, for example, a screen of the mobile device. The method 800 can be an implementation for the step 170 of the method 100 shown and described above with respect to FIG. 1. In some other embodiments, although not shown and described herein, a mobile device can be configured to display symbols representing POIs and the user on the user interface using any other suitable method.

At 171, the mobile device can be configured to calculate, based on a respective geographic position of each POI from a subset of POIs and a current location of a user, a respective vertical pixel offset and a respective horizontal pixel offset between a symbol representing each POI and a symbol representing the user. Specifically, the mobile device can be configured to map the user's current location to a predefined, fixed position on a map that is to be displayed on the user interface. Furthermore, each POI from the subset of POIs can be mapped to a position on the map based on the user's current location, the POI's geographic position, the predefined position on the map corresponding to the user's current location, and a maximum distance between two POIs from the subset of POIs. In some embodiments, the distance between the predefined position for the user's current location and the position for the POI on the map is associated with a pixel offset for that POI.

In some embodiments, as the map to be displayed on the user interface is in a rectangle shape, the pixel offset for a POI can consist of a vertical pixel offset and a horizontal pixel offset, which are the respective distances on the vertical axis and the horizontal axis for the pixel offset, respective. For example, the user's current location can be mapped to a center position of a horizontal line at the bottom of the map (assuming the map is in a rectangle shape). Each POI from the subset of POIs can be mapped to a position within the map. Thus, each position mapped for a POI is above the horizontal line at the bottom of the map (i.e., within the rectangle). An example of such a map displayed in a user interface is illustrated and described in further detail with respect to FIG. 18.

To determine a position in the map for each POI from the subset of POIs, the mobile device can be configured to calculate the pixel offset for the POI, and particularly, the vertical pixel offset and the horizontal pixel offset for the POI. In some embodiments, the vertical pixel offset can be calculated based on the user's current location, the azimuth angle for the POI and a width of the map (e.g., width of the user interface). Similarly, the horizontal pixel offset can be calculated based on the user's current location, the azimuth angle for the POI and a height of the map (e.g., height of the user interface).

In some embodiments, the mobile device can be configured to calculate a distance (gdistance) between the user's current location and the geographic position of a POI, and a maximum width (gwidth) between two POIs from the subset of POIs. In some embodiments, such a maximum width can be a maximum distance between two POIs from the subset of POIs, or a maximum horizontal distance between two POIs from the subset of POIs. A horizontal distance between two POIs is a distance value resulted from the path connecting the two POIs being projected onto the horizontal axis. Additionally, a predefined width of the user interface (mwidth in pixels) and a predefined height of the user interface (mheight in pixels) are available at the mobile device. Thus, the distance between the predefined position for the user's current location and the position for the POI in the map (mdistance in pixels) can be calculated as: mdistance=(mwidth/gwidth)*gdistance.

In some embodiments, although not further described herein, a maximum height (gheight) between two POIs from the subset of POIs can be used to calculate mdistance in a similar way as that uses the maximum width (gwidth). Similar to the maximum width, such a maximum height can be a maximum distance between two POIs from the subset of POIs, or a maximum vertical distance between two POIs from the subset of POIs. Similar to a horizontal distance, a vertical distance between two POIs is a distance value resulted from the path connecting the two POIs being projected onto the vertical axis. Thus, in such embodiments, mdistance can be calculated as: mdistance=(mheight/gheight)*gdistance. Furthermore, in some embodiments, mdistance can be calculated as: mdistance=min {(mheight/gheight), (mwidth/gwidth)}*gdistance or mdistance=max {(mheight/gheight), (mwidth/gwidth)}*gdistance.

The mobile device can be configured to calculate a first vertical pixel offset (left in pixels) and a first horizontal pixel offset (top in pixels) for the POI based on the azimuth angle for the POI (e.g., the angle NOA for POI A in FIGS. 5-7) and the calculated mdistance for the POI. First, the azimuth angle for the POI is reversed: NOA'=360−NOA. Next, the first vertical pixel offset and the first horizontal pixel offset for the POI can be calculated in different methods for various scenarios as shown in FIGS. 9-12.

Figure 9:
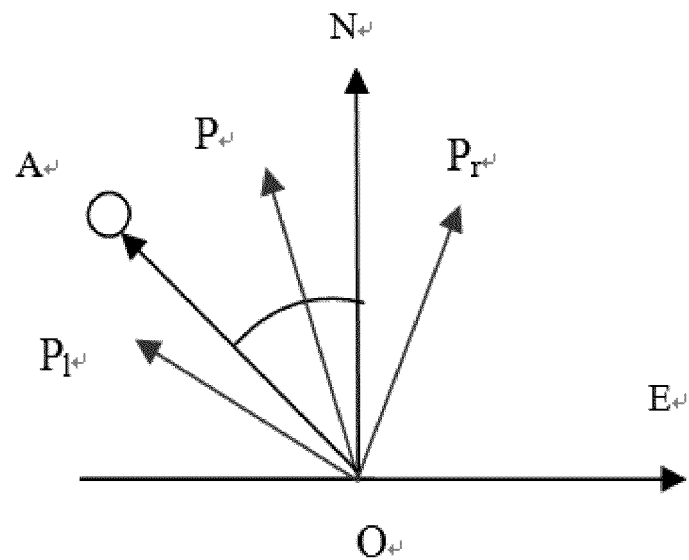
FIGS. 9-12 are schematic diagrams illustrating various scenarios for calculating pixel offsets of a POI in accordance with some embodiments.

FIGS. 9-12 are schematic diagrams, each of which illustrates a different scenario for calculating pixel offsets of a POI in accordance with some embodiments. Specifically, FIG. 9 illustrates a first scenario: when NOA'∈[0, 90), left=(mwidth/2)−mdistance*sin(NOA');

top=mheight−mdistance*cos(NOA').

Figure 10:
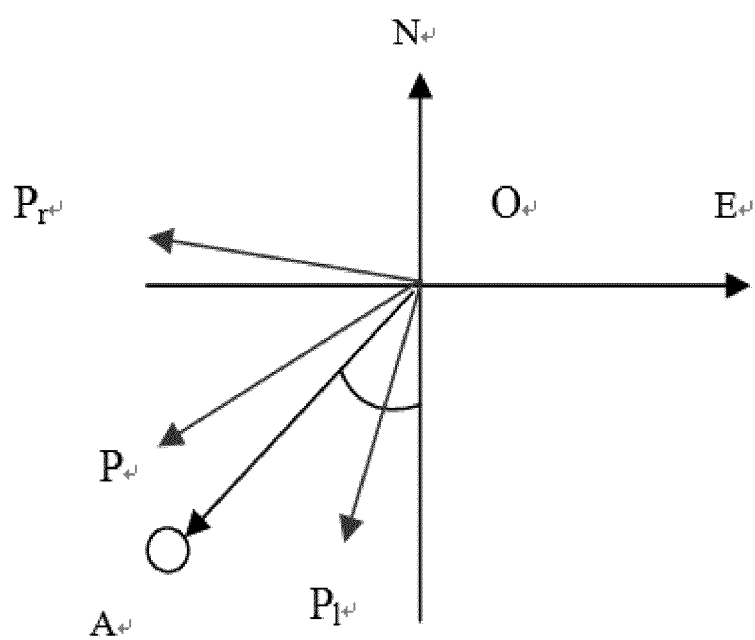

FIG. 10 illustrates a second scenario: when NOA'∈[90, 180), left=(mwidth/2)+mdistance*sin(180−NOA');

top=mheight−mdistance*cos(180−NOA').

Figure 11:
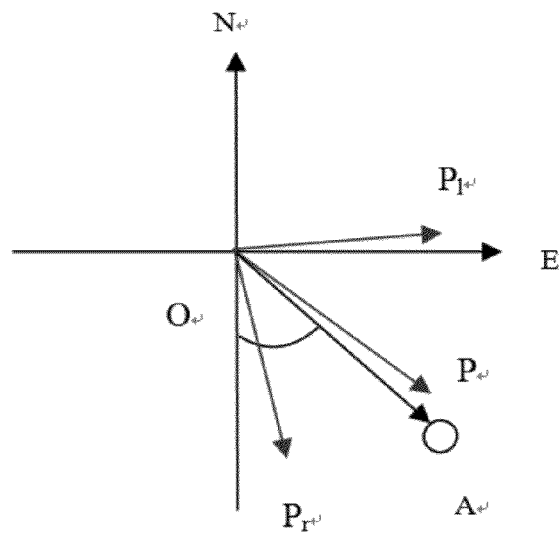

FIG. 11 illustrates a third scenario: when NOA'∈[180, 270), left=(mwidth/2)−mdistance*sin(NOA'−180);

top=mheight−mdistance*cos(NOA'−180).

Figure 12:
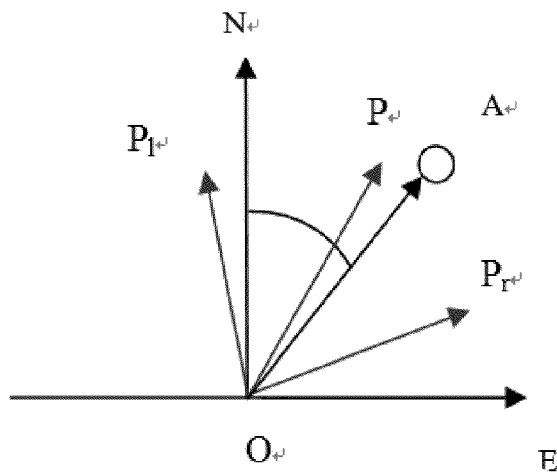

FIG. 12 illustrates a fourth scenario: when NOA'∈[270, 360), left=(mwidth/2)+mdistance*sin(360−NOA');

top=mheight−mdistance*cos(360−NOA').

Returning to FIG. 8, at 173, after determining the vertical pixel offset (e.g., the first vertical pixel offset described above) and the horizontal pixel offset (e.g., the first horizontal pixel offset described above) for each POI from the subset of POIs, the mobile device can be configured to display, in accordance with the vertical pixel offset and horizontal pixel offset, symbols representing the subset of POIs and the symbol representing the user on the user interface of the mobile device. Specifically, the mobile device can be configured to display the symbol representing the user (or the mobile device) at the predefined position on the user interface corresponding to the user's current location. The mobile device can be configured to display the respective symbol representing each POI from the subset of POIs at the corresponding position on the user interface, which is determined based on the calculated vertical pixel offset and horizontal pixel offset for that POI. An example of such a display on a user interface is illustrated and described in further detail with respect to FIG. 18.

Figure 13:
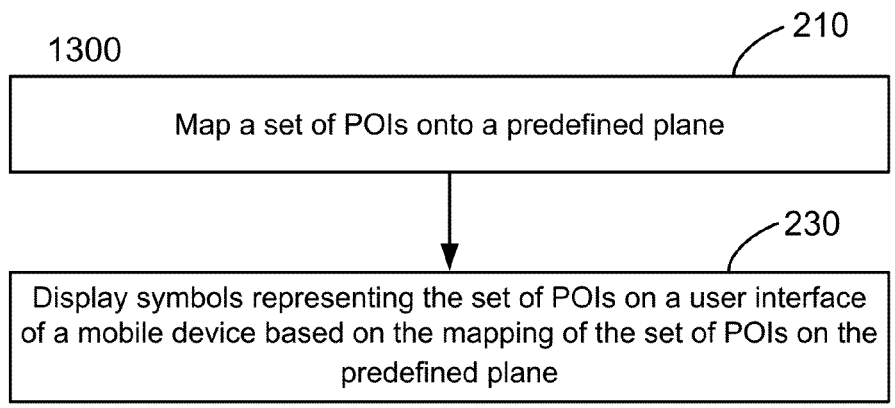
FIG. 13 is a flow chart illustrating a method performed at a mobile device for displaying symbols representing POIs on a user interface of a mobile device in accordance with some embodiments.

FIG. 13 is a flow chart illustrating a method 1300 performed at a mobile device for displaying symbols representing POIs on a user interface of a mobile device in accordance with some embodiments. The mobile device performing the method 1300 can be similar to the mobile device performing the method 100 as described above. The user interface can be, for example, a screen of the mobile device. The method 1300 can be performed at the mobile device in parallel to the method 100 being performed at the mobile device. In some embodiments, for example, the method 1300 can be performed at the mobile device after the step 130 of the method 100 is performed and prior to the step 150 of the method 100 being performed at the mobile device.

In some embodiments, the method 1300 is associated with an application for providing a location and/or navigation service to the user of the mobile device. In such embodiments, the application has a server-side portion stored in and/or executed at a server device communicating with the mobile device, and a client-side portion stored in and/or executed at the mobile device. Moreover, the method 1300 is governed by instructions or code of the client-side portion of the application that are stored in a non-transitory computer readable storage medium of the mobile device and executed by the one or more processors of the mobile device. As shown in FIG. 13, the method 1300 includes the following steps.

At 210, the mobile device can be configured to map a set of POIs onto a predefined plane. As described above with respect to the step 130 of the method 100, the set of POIs can be retrieved from a server device based on a current location of the user. In some embodiments, the set of POIs can include POIs surrounding the current location of the user, including POIs within or outside a current field of view associated with the user. In other words, the set of POIs is not limited to POIs falling within the current field of view associated with the user. In some embodiments, the predefined plane can be in a rectangle shape corresponding to a user interface (e.g., a screen) of the mobile device. In some embodiments, the set of POIs can be mapped to positions on the predefined plane based on the geographic distribution of the set of POIs surrounding the user's current location, including the geographic positions of the set of POIs and the current location of the user. Details of mapping the set of POIs onto the predefined plane are shown and described with respect to FIGS. 14-17.

At 230, the mobile device can be configured to display symbols representing the set of POIs on the user interface of the mobile device based on the mapping of the set of POIs on the predefined plane. As a result, the distribution of the POIs is shown on the user interface of the mobile device, thus viewable to the user. In some embodiments, the predefined plane can be associated with a map to be displayed on the user interface of the mobile device. Such a map can be in a circle shape, a rectangle shape, or any other suitable shape to represent the area surrounding the user's current location.

In some embodiments, information or data (e.g., geographic positions, entity information data) of the set of POIs can be displayed on the user interface using a list, a table, an electronic map, a radar thumbnail, and/or any other suitable form. For example, a list can be displayed on the user interface containing a name, a geographic position, a distance and direction to the user's current location, etc., of each POI from the set of POIs. For another example, an electronic map containing a symbol and associated information for each POI from the set of POIs (including a name, description, distance to the user's current location, etc.) can be displayed on the user interface. For yet another example, a radar thumbnail presenting a distribution of spots, each of which represents a POI from the set of POIs, can be displayed on the user interface, as illustrated by the radar thumbnail displayed at the bottom-left corner of the screen shown in FIG. 18.

In some embodiments, to display an electronic map presenting the set of POIs, the mobile device can be configured to download or receive map images associated with the area surrounding the user's current location. In some embodiments, the mobile device can avoid downloading or receiving any map image when the mobile device is configured to display a list, a table, a radar thumbnail, and/or the like. In such embodiments, the mobile device can be configured to receive the geographic data (e.g., geographic positions, entity information data) of the set of POIs in textual form without any accompany map image.

Figure 14:
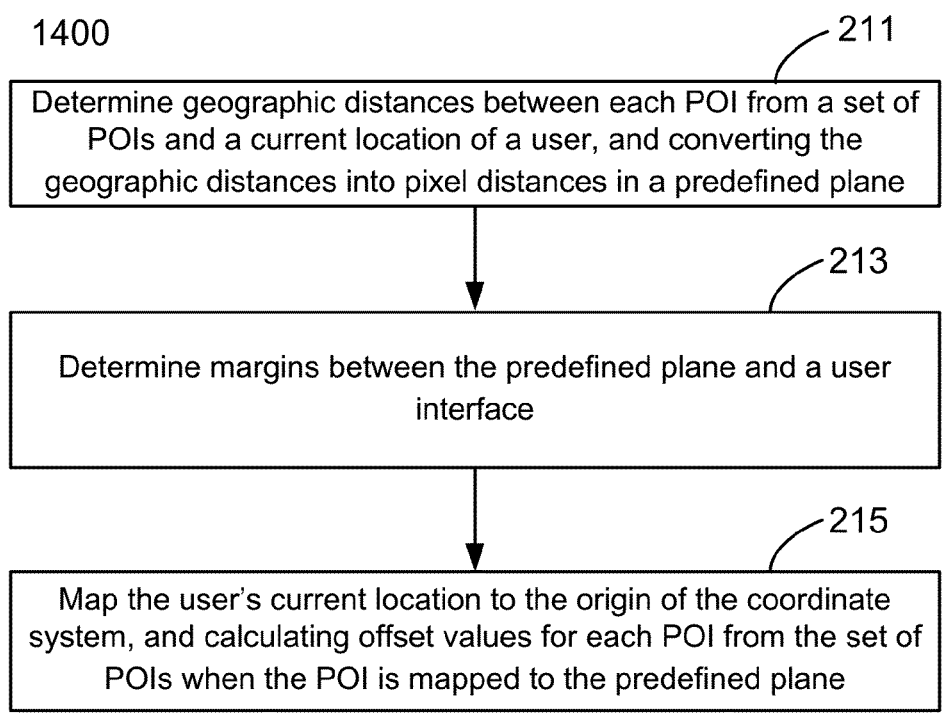
FIG. 14 is a flow chart illustrating a method performed at a mobile device for mapping a set of POIs to a predefined plane in accordance with some embodiments.
Figure 15:
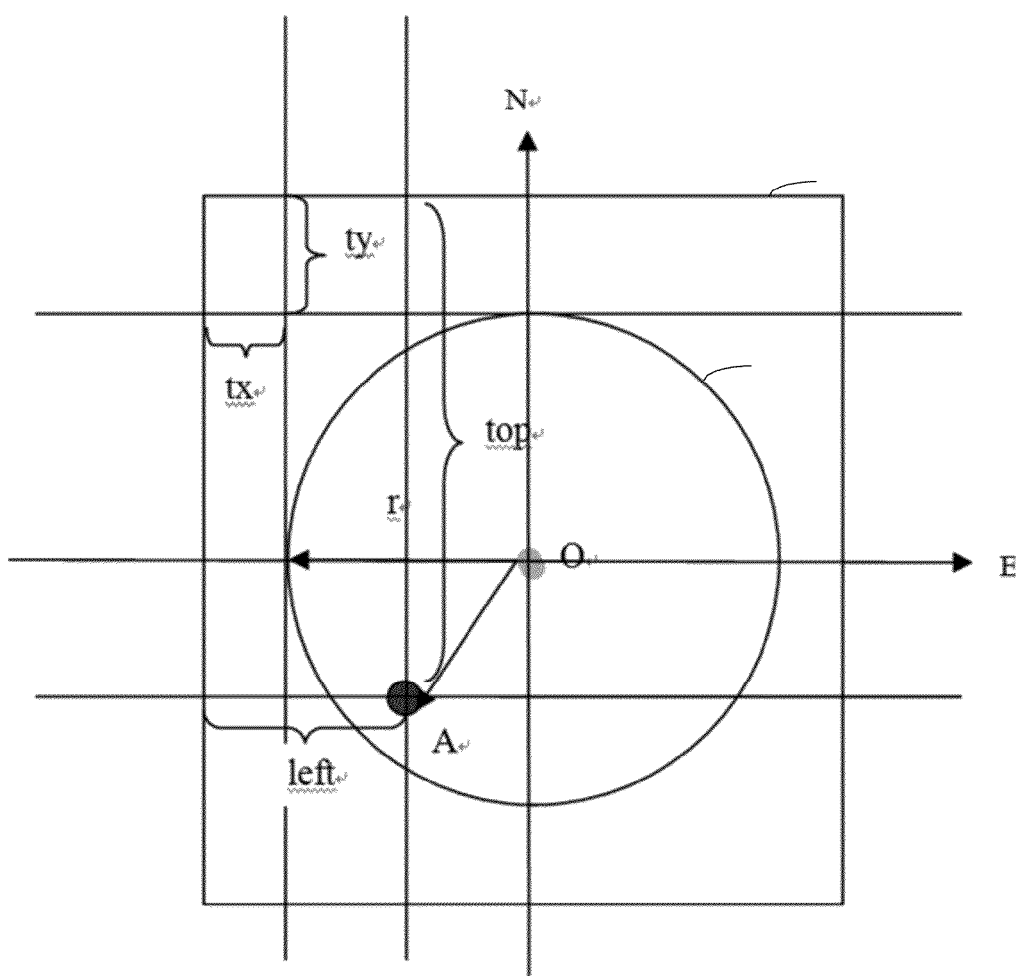
FIG. 15 is a schematic diagram illustrating performing the method of FIG. 14.

FIG. 14 is a flow chart illustrating a method 1400 performed at a mobile device for mapping a set of POIs to a predefined plane in accordance with some embodiments. The method 1400 can be an implementation for the step 210 of the method 1300 shown and described above with respect to FIG. 13. In some other embodiments, although not shown and described herein, a mobile device can be configured to map the set of POIs to a predefined plane using any other suitable method. FIG. 15 is a schematic diagram illustrating performing the method of FIG. 14. As shown in FIG. 15, the circle 1510 represents the predefined plane, and the rectangle 1530 represents the user interface (e.g., a screen) of the mobile device. Furthermore, O (i.e., the origin of the coordinate system and center of the predefined plane 1510 and the user interface 1530) represents a predefined position in the predefined plane and the user interface corresponding to the user's current location; and A represents a position in the predefined plane and the user interface corresponding to a given POI from the set of POIs.

At 211, the mobile device can be configured to determine geographic distances between each POI from the set of POIs and the user's current location. The mobile device can be configured to further convert the determined geographic distances into pixel distances in the predefined plane. Specifically, as described above with respect to the step 171 of the method 800, the mobile device can be configured to calculate the geographic distance (gdistance) between each POI from the set of POIs and the user's current location, and a maximum width (gwidth) between two POIs from the set of POIs. Additionally, a predefined width of the user interface (mwidth in pixels) can be available at the mobile device. Thus, the mobile device can be configured to calculate the distance (i.e., OA in pixels in FIG. 15) between the predefined position for the user's current location (i.e., O in FIG. 15) and the position for the POI in the predefined plane (i.e., A in FIG. 15) as:

$$OA=(m\text{width}/g\text{width})*g\text{distance}.$$

As a result, the relative distance (i.e., OA) between the respective symbol representing the corresponding POI (i.e., A) and the respective symbol representing the user (i.e., O) shown on the user interface is based on an aspect ratio of a display pixel of the mobile device (i.e., mwidth/gwidth).

At 213, the mobile device can be configured to determine margins between the predefined plane (i.e., the circle 1510 in FIG. 15) and the user interface (i.e. the rectangle 1530 in FIG. 15). As shown in FIG. 15, the due north direction is set as the positive axis of the vertical coordinate, and the due east direction is set as the positive axis of the horizontal coordinate. The margins between the predefined plane 1510 and the user interface 1530 include a horizontal margin tx and a vertical margin ty.

At 215, the mobile device can be configured to map the user's current location to the origin of the coordinate system (i.e., O in FIG. 15), and calculate offset values for each POI from the set of POIs when the POI is mapped to the predefined plane (i.e., 1510 in FIG. 15). Specifically, the offset values calculated for each POI include a second vertical pixel offset (left in pixels) and a second horizontal pixel offset (top in pixels) for the POI, which can be calculated based on the margins (i.e., tx and ty in FIG. 15), the pixel distance (i.e., OA in FIG. 15) between the predefined position for the user's current location and the position for the POI in the predefined plane, the azimuth angle for the POI A (NOA), and/or other parameter. First, the azimuth angle for the POI A is reversed:

NOA'=360−NOA. Next, as shown in FIG. 15, the pixel offsets of the POI A can be calculated as (r represents the radius of the circle 1510):

left=r−OA*sin(NOA')+tx;

top=r−OA*cos(NOA')+ty.

In some embodiments, after performing the method 1400 (including the steps 211-215) on the set of POIs, the mobile device can be configured to perform the following operations on the POIs that are mapped to outside of the predefined plane (i.e., 1510 in FIG. 15), in order to complete the step 210 of the method 1300 shown and described above with respect to FIG. 13. In such embodiments, the mobile device can be configured to calculate offset correction values for those POIs based on the radius of the predefined plane (i.e., r), the margins (i.e., tx and ty) and the positions of the POIs. The offset correction values include a horizontal offset correction value eleft in pixels, and a vertical offset correction value etop in pixels. As a result, those POIs can be mapped to the edge of the predefined plane, such that symbols representing those POIs can be displayed within the user interface and the user can determine a direction to each of those POIs.

Specifically, the offset correction values can be calculated as:

eleft=r−r*sin(NOA')+tx;

etop=r−r*cos(NOA')+ty.

Figure 16:
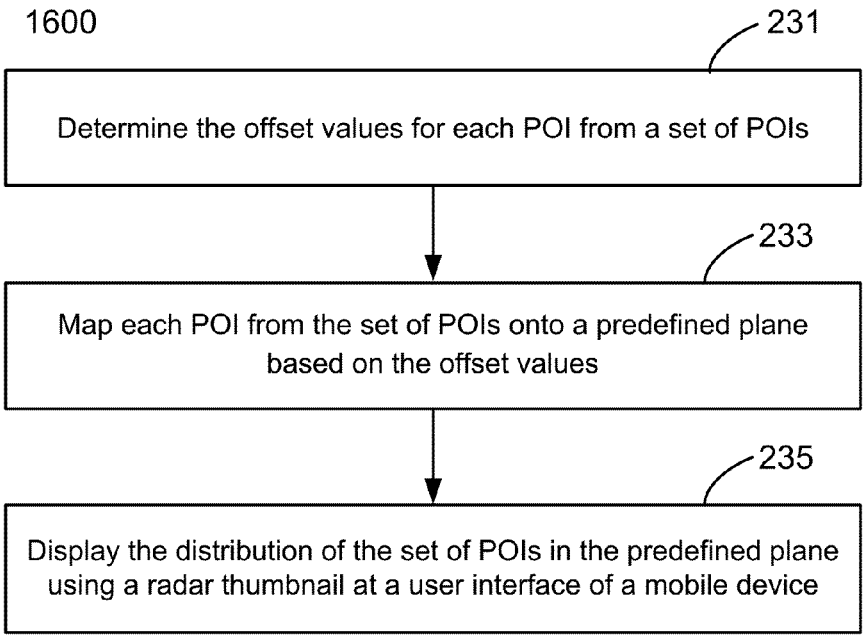
FIG. 16 is a flow chart illustrating a method performed at a mobile device for displaying symbols representing POIs on a user interface based on mapping of the POIs on a predefined plane in accordance with some embodiments.

FIG. 16 is a flow chart illustrating a method 1600 performed at a mobile device for displaying symbols representing POIs on a user interface based on mapping of the POIs on a predefined plane in accordance with some embodiments. The method 1600 can be an implementation for the step 230 of the method 1300 shown and described above with respect to FIG. 13. In some other embodiments, although not shown and described herein, a mobile device can be configured to display symbols representing POIs on a user interface using any other suitable method.

At 231, the mobile device can be configured to determine offset values for each POI from the set of POIs. Specifically, as described above with respect to the step 215 of the method 1400, the mobile device can be configured to calculate a second vertical pixel offset and a second horizontal pixel offset for each POI from the set of POIs. For example, as shown in FIG. 15, the mobile device calculates a second horizontal pixel offset (left) and a second vertical pixel offset (top) for the POI A based on the margins tx and ty, the pixel distance OA, the radius (r) for the predefined plane 1510, and the azimuth angle NOA for the POI A.

At 233, the mobile device can be configured to map each POI from the set of POIs onto the predefined plane based on the offset values for that POI. That is, the mobile device can be configured to determine a position in the predefined plane for each POI from the set of POIs based on the offset values calculated for that POI. For example, as shown in FIG. 15, the POI A is mapped to a position in the predefined plane 1510 that has a distance of the second horizontal pixel offset (left) to the left edge of the user interface 1530 and has a distance of the second vertical pixel offset (top) to the top edge of the user interface 1530.

At 235, the mobile device can be configured to display the distribution of the set of POIs in the predefined plane using a radar thumbnail at the user interface of the mobile device. For example, the radar thumbnail at the bottom-left corner of the screen shown in FIG. 18 displays a distribution of a set of POIs in a predefined plane (i.e., the circle). In such a radar thumbnail, each POI from the set of POIs is represented by a light-spot at a position in the predefined plane that is mapped to the geographic position of that POI. The radar thumbnail is an azimuthal projection map with the use's location represented at the center.

Figure 17:
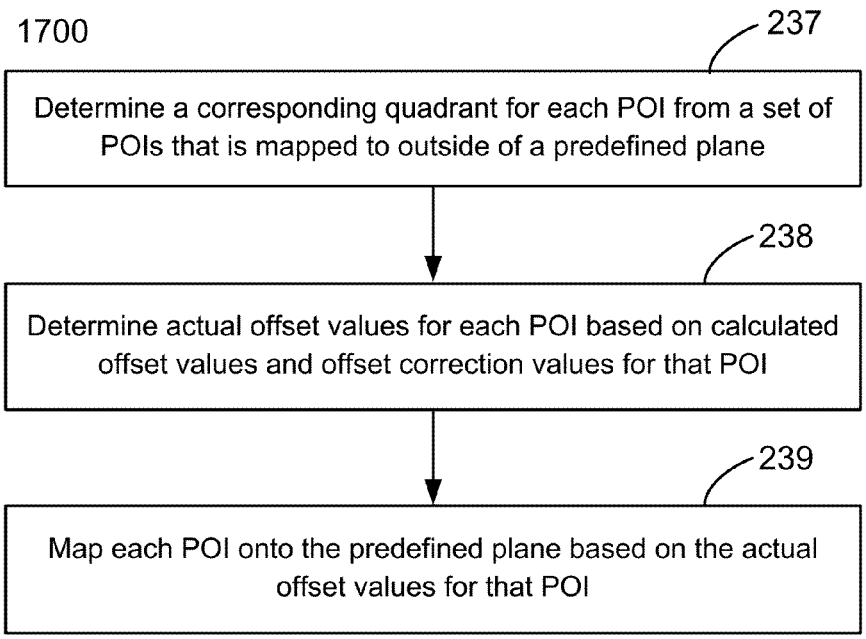
FIG. 17 is a flow chart illustrating a method performed at a mobile device for displaying symbols representing POIs on a user interface based on mapping of the POIs on a predefined plane in accordance with some other embodiments.

FIG. 17 is a flow chart illustrating another method 1700 performed at a mobile device for displaying symbols representing POIs on a user interface based on mapping of the POIs on a predefined plane in accordance with some other embodiments. The method 1700 can be supplementary to the method 1600 for implementing the step 230 of the method 1300 shown and described above with respect to FIG. 13. In some embodiments, the method 1700 can be performed after the step 233 of the method 1600 is performed and prior to the step 235 of the method 1600 being performed at the mobile device. In some embodiments, the method 1700 can be performed on POIs that are mapped to outside of the predefined plane (e.g., 1510 in FIG. 15) as a result of the step 233 of the method 1600 being performed.

At 237, the mobile device can be configured to determine a corresponding quadrant for each POI from the set of POIs that is mapped to outside of the predefined plane. Specifically, the mobile device can be configured to determine the corresponding quadrant for a POI based on the azimuth angle for that POI (e.g., NOA for the POI A in FIG. 15).

At 238, the mobile device can be configured to determine actual offset values for each POI from the set of POIs that is mapped to outside of the predefined plane based on calculated offset values and offset correction values for that POI, and the quadrant for that POI. The offset values (left, top) and offset correction values (eleft, etop) for a POI can be calculated using the method described above with respect to the method 1400 of FIG. 14. The resulted actual offset values include an actual horizontal offset value (aleft) and an actual vertical offset value (atop), which can be calculated as:

(1) when a POI A is within the first quadrant (i.e., the azimuth angle NOA c [0, 90)), aleft=max(left, eleft), atop=max(top, etop);

(2) when a POI A is within the second quadrant (i.e., the azimuth angle NOA E [90, 180)), aleft=max(left, eleft), atop=min(top, etop);

(3) when a POI A is within the third quadrant (i.e., the azimuth angle NOA E [180, 270)), aleft=min(left, eleft), atop=min(top, etop); and (4) when a POI A is within the fourth quadrant (i.e., the azimuth angle NOA c [270, 360)), aleft=min(left, eleft), atop=max(top, etop).

At 239, the mobile device can be configured to map each POI from the set of POIs that has actual offset values calculated at 238 onto the predefined plane based on the actual offset values for that POI. That is, the mobile device can be configured to determine, based on the calculated actual offset values, a position within the predefined plane (including the edge of the predefined plane) for each POI from the set of POIs that is initially mapped to outside of the predefined plane. Subsequently, those POIs can be displayed by symbols (e.g., light-spots) within the radar thumbnail on the user interface of the mobile device. Thus, as a result of performing the method 1600 and the method 1700, the mobile device can display a distribution of each POI from the set of POIs within a radar thumbnail.

Figure 18:
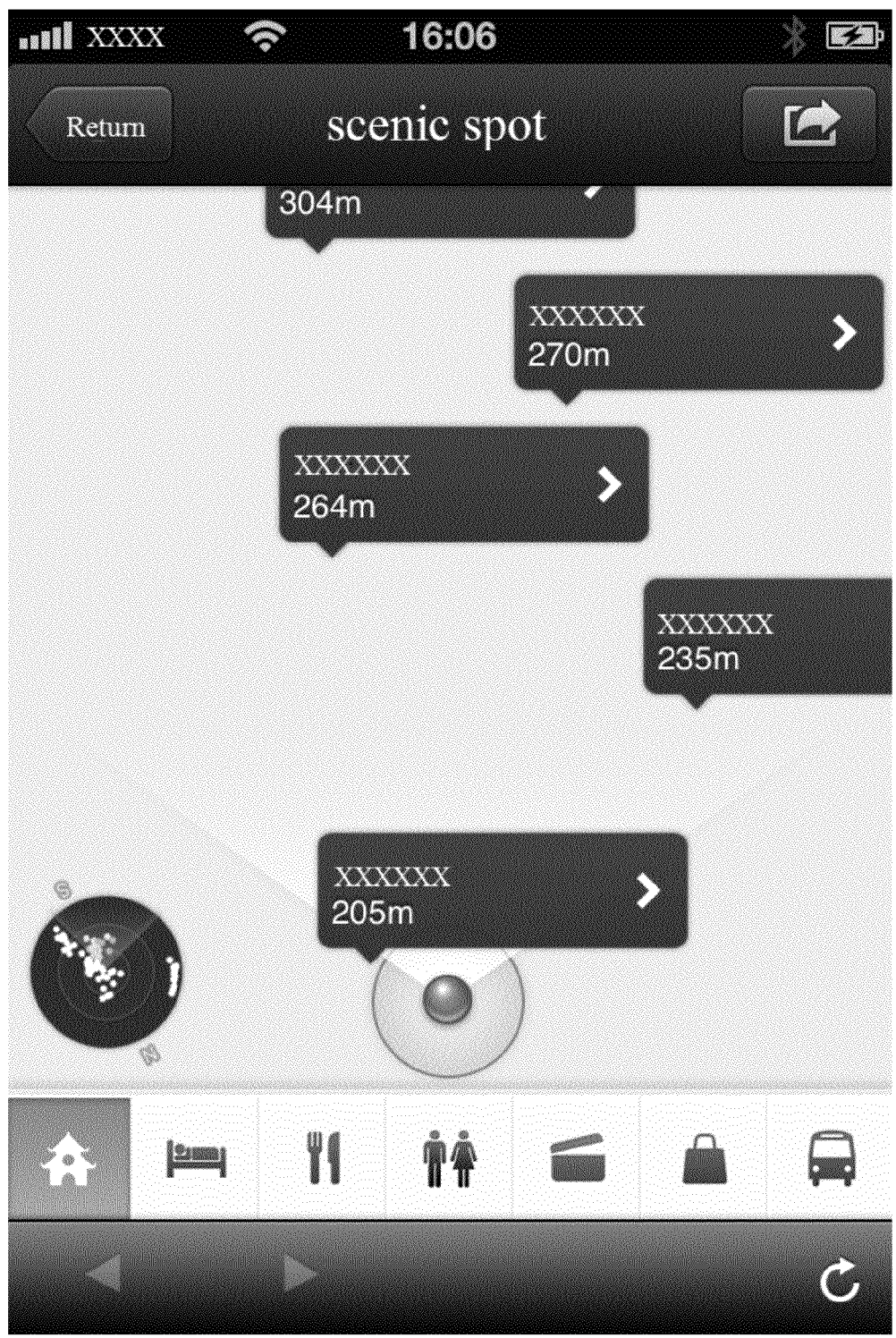
FIG. 18 is a schematic diagram illustrating a screenshot of a mobile device providing a location service in accordance with some embodiments.

FIG. 18 is a schematic diagram illustrating a screenshot of a mobile device providing a location service in accordance with some embodiments. As shown in FIG. 18, the mobile device concurrently presents two maps in a user interface (e.g., screen) of the mobile device: a first map displayed at a main window of the user interface and a second map displayed at the bottom-left corner of the user interface. In some embodiments, the first map can be, for example, a cylindrical projection map. Specifically, as a result of performing the methods 100, 200 and 800 described above, the mobile device can be configured to display a distribution of a subset of POIs from a set of POIs in the first map. The subset of POIs can be identified as being included in a current field of view associated with a user operating the mobile device. In some embodiments, at least one POI from the set of POIs and not included in the subset of POIs is not displayed in the first map.

As shown in FIG. 18, the current field of view associated with the user is visually represented in the first map. Specifically, a symbol (e.g., the circle with a dot in the center) representing the user (or the mobile device, or a current location of the user) is displayed at the center of the bottom portion of the main window. Each POI from the subset of POIs is represented by a respective symbol at a respective position in the main window that is mapped to a geographic position of that POI in the current field of view. Each symbol representing a POI from the subset of POIs includes at least a respective name (e.g., XXX) of the POI and information indicating a distance (e.g., 205 m) between that POI and the user. Furthermore, each symbol representing a POI also optionally provides a link (represented by the right-arrow ">") that can potentially present more information (e.g., a description, navigation information, images, etc.) of the POI to the user when selected. In some embodiments, after the user clicks a particular link, the information of the corresponding POI can be displayed in a pop-up window or a new window, thus become viewable to the user. In some embodiments, the current field of view of the user is visually represented on the map, e.g., by the spreading beam of light emanating from the symbol representing the user on the map. All of the POIs shown in the map are within the angle defined by the field of view.

In some embodiments, the second map can be, for example, an azimuthal projection map such as a radar thumbnail. Specifically, as a result of performing the methods 1300, 1400, 1600 and 1700 described above, the mobile device can be configured to display a distribution of every POI from the set of POIs using a radar thumbnail at the bottom-left corner of the user interface. In such a radar thumbnail, the user's current location is mapped to the center of the radar thumbnail, and each POI from the set of POIs is represented by a light-spot at a position that is mapped to the geographic position of that POI. Furthermore, a circular sector formed by two rays from the center of the radar thumbnail is displayed in the radar thumbnail to indicate the current field of view of the user. Additionally, such a circular sector can also be presented in the first map (as shown in FIG. 18) indicating that the first map presents the current field of view associated with the user instead of a panoramic map like the second map. In some embodiments, more or less information of the POIs can be displayed in the main window and/or the radar thumbnail. In some embodiments, a distribution of every POI from the set of POIs can be displayed to the user using any other suitable form such as, for example, a map, a panoramic map, a list, a table, and/or the like.

In some embodiments, the mobile device can be configured to identify the subset of POIs from the set of POIs based at least in part on a category of the POIs. In such embodiments, the user can select a first POI category from a group of predefined POI categories. In response to receiving the selection of the first POI category, the mobile device can be configured to identify a subset of POIs from the set of POIs, where each POI from the subset of POIs is within the selected first category of POIs and located within the current field of view. As a result, only the POIs belonging to the first category of POIs and located within the current field of view are presented in the first map (e.g., a cylindrical projection map).

In such embodiments, the user can change her selection of the POI category to obtain information of POIs belonging to another POI category. Specifically, the user can select a second POI category from the group of predefined POI categories that is different from the first POI category. In response to receiving the updated selection of the second POI category, the mobile device can be configured to identify an updated subset of POIs from the set of POIs, where each POI from the updated subset of POIs is within the second category of POIs and located within the current field of view. As a result, the POIs belonging to the second category of POIs and located within the current field of view replace the POIs belonging to the first category of POIs to be presented in the updated first map.

The group of predefined POI categories can include, for example, scenic spots, lodgings, restaurants, restrooms, shopping locations (e.g., shops or stores), public transportations (e.g., bus stops, train stations), and/or the like. In some embodiments, the mobile device can be configured to present symbols representing the group of predefined POI categories in the user interface for the user to select. For example, as shown in FIG. 18, a line of buttons is presented at the bottom of the user interface, each of which represents a predefined category of POIs. The user can select a predefined category of POIs by clicking the corresponding button. As a result, symbols representing POIs of the selected category are presented in the first map. The user can then obtain an updated first map of POIs of a different category by clicking the button representing that different category of POIs. In other embodiments, the user can select a category of POIs in any suitable method. For example, the user can enter a keyword for a category of POIs (e.g., in a text input box), which is then used by the mobile device to determine a category of POIs.

In some embodiments, the mobile device can be configured to present a distribution of POIs belonging to a selected category of POIs in the second map (e.g., an azimuthal projection map). For example, as shown in FIG. 18, when a POI category "scenic spots" is selected (as the first button being highlighted), POIs belonging to the category "scenic spots" that are surrounding the user's current location are presented (via light-spots) in the radar thumbnail. In such embodiments, when the user selects a different POI category, the POIs presented in the second map are changed along with the POIs presented in the first map. In some other embodiments, the mobile device can be configured to present a distribution of POIs belonging to more than one or all of the predefined POI categories in the second map. In such embodiments, when the user selects a different POI category, the POIs presented in the second map can remain unchanged, while the POIs presented in the first map are changed to POIs belonging to the updated category of POIs. In some embodiments, the symbols for each category of POIs can have a respective color, and the light spots for the POIs belonging to the selected category on the radar thumbnail can take on the respective color assigned to the selected category, while the light spots for the POIs belonging to the other unselected categories all have the same color (e.g., white). This way, the user can see easily from the radar thumbnail where (e.g., which quadrant) POIs of his/her interested category are concentrated and turn to that direction to see the details of those POIs on the bigger first map.

In some embodiments, the POIs presented in the first map (e.g., a cylindrical projection map) and/or the second map (e.g., an azimuthal projection map) can be updated with the change of the user's current location and/or current viewing direction. In a scenario, when the user's current viewing direction is changed and the user's current location remains unchanged (e.g., the user turns the mobile device to a different direction without moving to a different location), the current field of view associated with the user is changed while the set of POIs is not changed. As a result, the mobile device identifies an updated subset of POIs from the set of POIs based on the updated current viewing direction of the user. The mobile device then maps POIs from the updated subset of POIs onto the first map, and then displays the updated first map on the user interface. Meanwhile, the current field of view indicated in the second map (e.g., by a circular sector as shown in FIG. 18) can be updated accordingly.

In another scenario, when the user's current location is changed (e.g., the user moves to a different location) regardless whether the user's current viewing direction being changed, both the set of POIs and the current field of view are changed. As a result, the mobile device identifies an updated subset of POIs from the updated set of POIs based on the updated current field of view. The mobile device then maps POIs from the updated subset of POIs onto the first map, and then displays the updated first map on the user interface. Meanwhile, the POIs presented in the second map and/or the current field of view indicated in the second map can be updated accordingly.

In some embodiments, an emulated thread can be used to plot the distribution of symbols and/or light-spots in a cylindrical projection map or an azimuthal projection map (e.g., a radar thumbnail). In some embodiments, the methods described above for providing a location and/or navigation service can be implemented, for example, using HTML5 (e.g., Javascript of HTML5). As multithreading is not supported by Javascript of HTML5, a single emulated thread can be used to implement the methods. In such embodiments, for example, a setTimeout function can be invoked to plot the symbols and/or light-spots of the POIs. The setTimeout function can be referred to as an emulated thread, which enables the plotting of the symbols and/or light-spots to be performed simultaneously with the current thread.

Figure 19:
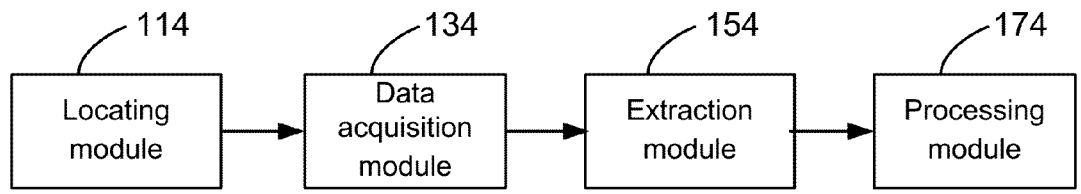
FIG. 19 is a block diagram illustrating modules of an apparatus for providing a location service in accordance with some embodiments.

FIG. 19 is a block diagram illustrating modules of an apparatus for providing a location service in accordance with some embodiments. Such an apparatus can be, for example, a mobile device as described with respect to FIG. 1. The apparatus can be operatively coupled to (e.g., via a network described with respect to FIG. 1) and communicate with one or more server devices (e.g., as described with respect to FIG. 1) to provide the location service. The apparatus can be operated by a user as described with respect to FIG. 1.

As shown in FIG. 19, the apparatus includes a locating module 114, a data acquisition module 134, an extraction module 154 and a processing module 174. In some embodiments, each module included in the apparatus can be a hardware-based module (e.g., a digital signal processor (DSP), a field programmable gate array (FPGA), etc.), a software-based module (e.g., a module of computer code executed at a processor, a set of processor-readable instructions executed at a processor, etc.), or a combination of hardware and software modules. Instructions or code of each module can be stored in a memory of the apparatus (not shown in FIG. 19) and executed at a processor (e.g., a CPU) of the apparatus (not shown in FIG. 19).

The locating module 114 can be configured to determine a current location (e.g., longitude coordinate and latitude coordinate) of the apparatus, and a current viewing direction (e.g., a magnetic north angle) of the apparatus. As described above with respect to FIG. 1, the locating module 114 can be configured to determine the current location and viewing direction of the apparatus by performing the step 110 of the method 100. In some embodiments, for example, the locating module 114 can include hardware such as a GPS used to determine the current location and a compass used to determine the current viewing direction. Furthermore, the locating module 114 can be configured to invoke an interface function (e.g., getCurrentPosition) supported by HTML5 to acquire the determined location information. The locating module 114 can also be configured to acquire the determined direction information by monitoring the rotational movement of the apparatus (e.g., using HTML5 device orientation application).

The data acquisition module 134 can be configured to retrieve geographic data of POIs from the server device. As described above with respect to FIG. 1, the data acquisition module 134 can be configured to retrieve the geographic data of the POIs by performing the step 130 of the method 100. Specifically, the data acquisition module 134 can be configured to send a request for geographic data to the server device. Such a request can include information of the current location of the apparatus. Subsequently, the data acquisition module 134 can be configured to receive the geographic data from the server device. The received geographic data can be associated with a set of POIs within a surrounding area defined based on the current location of the apparatus. In some embodiments, the received geographic data can include geographic positions and entity information data for the set of POIs. In some embodiments, the received geographic data can be stored in a memory of the apparatus. In such embodiments, the geographic data can be retrieved locally from the memory in a subsequent use. In some embodiments, the data acquisition module 134 can be configured to retrieve the geographic data of the set of POIs in textual form without any accompanying map image.

The extraction module 154 can be configured to identify a subset of POIs within a current field of view associated with the user. As described above with respect to FIG. 1, the extraction module 154 can be configured to identify the subset of POIs by performing the step 150 of the method 100. The current field of view can be defined based on, for example, the current location of the apparatus, the current viewing direction of the user, and/or other predefined parameter (e.g., a predefined radius and/or a predefined angular range for the user's current field of view). In some embodiments, for example, the current field of view associated with the user can be defined as a circular sector with a predefined radius and angle, where the current location of the apparatus is the origin of the circle and the current viewing direction of the user is the angular bisector of the angle.

Figure 20:
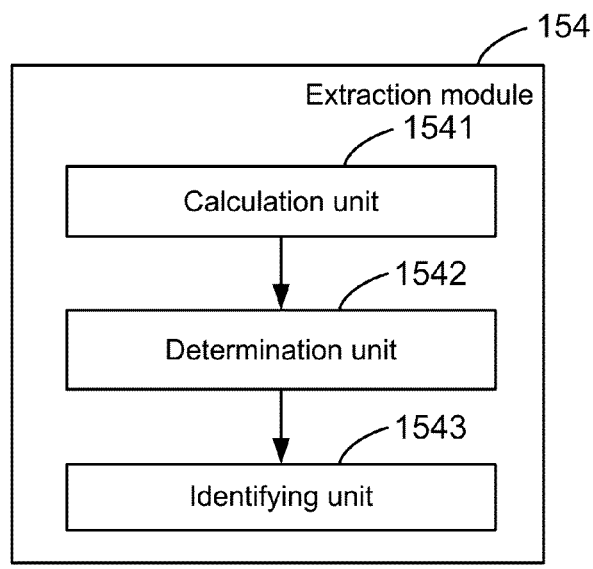
FIG. 20 is a block diagram illustrating inner structure of the extraction module shown in FIG. 19 in accordance with some embodiments.

FIG. 20 is a block diagram illustrating inner structure of the extraction module 154 shown in FIG. 19 in accordance with some embodiments. As shown in FIG. 20, the extraction module 154 includes a calculation unit 1541, a determination unit 1542 and an identifying unit 1543. Each unit included in the extraction module 154 can be a sub-module of the extraction module 154, which can be a hardware-based module (e.g., a DSP, a FPGA, etc.), a software-based module (e.g., a module of computer code executed at a processor, a set of processor-readable instructions executed at a processor, etc.), or a combination of hardware and software modules.

Specifically, the calculation unit 1541 can be configured to calculate an azimuth angle for each POI from the set of POIs. As described above with respect to FIGS. 2 and 3, the calculation unit 1541 can be configured to calculate the azimuth angles by performing the step 151 of the method 200.

The determination unit 1542 can be configured to determine, based at least in part on the respective azimuth angle of each POI from the set of POIs, whether that POI is within the user's current field of view. As described above with respect to FIGS. 2 and 4-7, the determination unit 1542 can be configured to make such a determination by performing the step 153 of the method 200. Particularly, the determination unit 1542 can be configured to make the determination using various methods for different scenarios as illustrated and described above with respect to FIGS. 5-7.

After a POI from the set of POIs is determined by the determination unit 1542 to be within the user's current field of view, the identification unit 1543 can be configured to identify that POI as being included in the subset of POIs. As described above with respect to FIG. 2, the identification unit 1543 can be configured to identify the subset of POIs by performing the step 155 of the method 200.

Returning to FIG. 19, the processing module 174 can be configured to map the current location of the apparatus and the geographic positions of the subset of POIs onto a user interface (e.g., screen) of the apparatus. As described above with respect to FIG. 1, the processing module 174 can be configured to perform the step 170 of the method 100. As a result, symbols representing the current location of the apparatus and the subset of IPOs can be presented in the user interface of the apparatus (e.g., as shown in FIG. 18).

Figure 21:
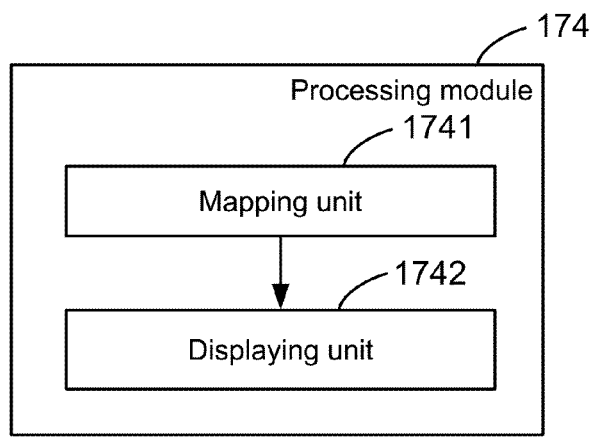
FIG. 21 is a block diagram illustrating inner structure of the processing module shown in FIG. 19 in accordance with some embodiments.

FIG. 21 is a block diagram illustrating inner structure of the processing module 174 shown in FIG. 19. As shown in FIG. 21, the processing module 174 includes a mapping unit 1741 and a displaying unit 1742. Each unit included in the processing module 174 can be a sub-module of the processing module 174, which can be a hardware-based module (e.g., a DSP, a FPGA, etc.), a software-based module (e.g., a module of computer code executed at a processor, a set of processor-readable instructions executed at a processor, etc.), or a combination of hardware and software modules.

Specifically, the mapping unit 1741 can be configured to calculate, based on a respective geographic position of each POI from the subset of POIs identified by the extraction module 154 and a current location of the apparatus, a respective vertical pixel offset and a respective horizontal pixel offset between a symbol representing each POI and a symbol representing the user. As described above with respect to FIGS. 8-12, the mapping unit 1741 can be configured to make such a calculation by performing the step 171 of the method 800. Particularly, the mapping unit 1741 can be configured to calculate the pixel offsets using various methods for different scenarios as illustrated and described above with respect to FIGS. 9-12 (i.e., the azimuth angle for a POI being within one of the four quadrants).

After the offset values for a POI are calculated by the mapping unit 1741, the displaying unit 1742 can be configured to display, in accordance with the calculated pixel offsets, symbols representing the subset of POIs and the symbol representing the user on the user interface of the apparatus. As described above with respect to FIG. 8, the displaying unit 1742 can be configured to display the symbols by performing the step 173 of the method 800.

Figure 22:
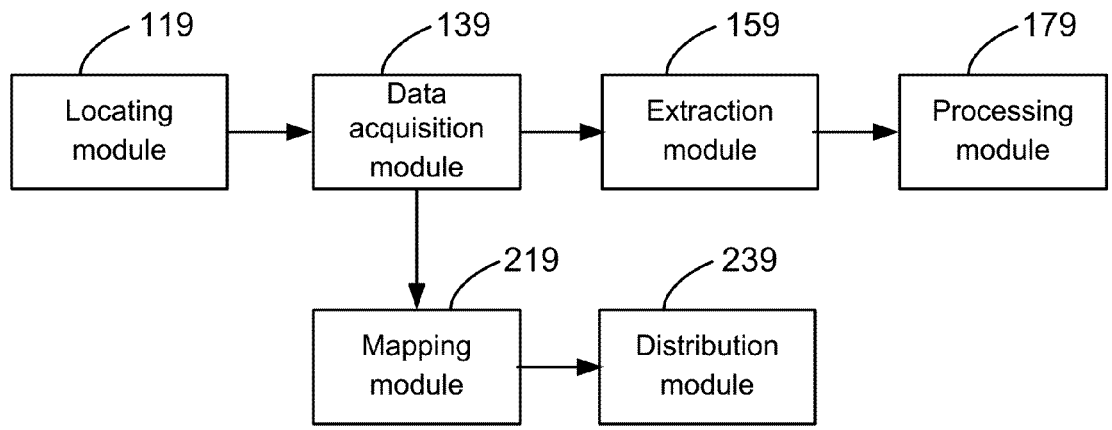
FIG. 22 is a block diagram illustrating modules of another apparatus for providing a location service in accordance with some other embodiments.

FIG. 22 is a block diagram illustrating modules of another apparatus for providing a location service in accordance with some other embodiments. The apparatus can be similar to the apparatus described above with respect to FIGS. 19-21. Specifically, such an apparatus can be, for example, a mobile device as described with respect to FIG. 1. The apparatus can be operatively coupled to (e.g., via a network described with respect to FIG. 1) and communicate with one or more server devices (e.g., as described with respect to FIG. 1) to provide the location service. The apparatus can be operated by a user as described with respect to FIG. 1.

As shown in FIG. 22, the apparatus includes a locating module 119, a data acquisition module 139, an extraction module 159, a processing module 179, a mapping module 219 and a distribution module 239. The locating module 119, data acquisition module 139, extraction module 159 and the processing module 179 can be structurally and functionally similar to the locating module 114, data acquisition module 134, extraction module 154 and processing module 174 of the apparatus of FIG. 19, respectively.

The mapping module 219 can be configured to map a set of POIs onto a predefined plane. As described above with respect to FIG. 13, the mapping module 219 can be configured to map the set of POIs onto the predefined plane by performing the step 210 of the method 1300.

Figure 23:
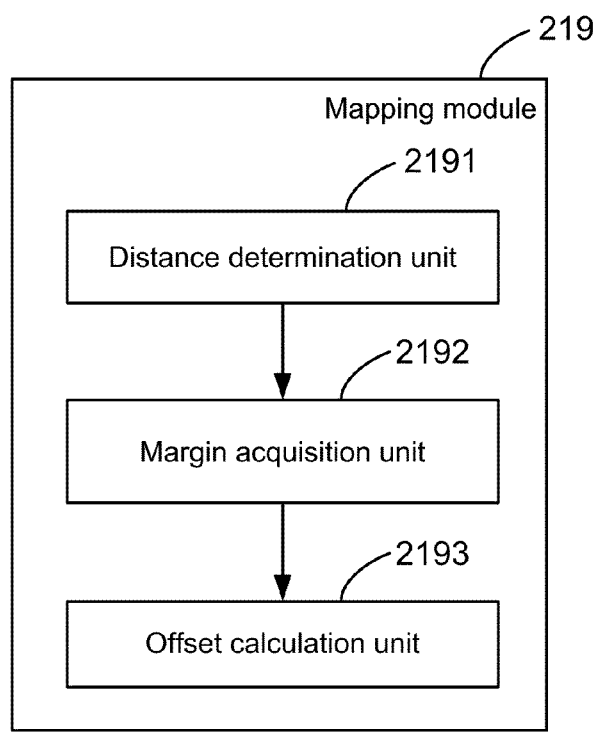
FIG. 23 is a block diagram illustrating inner structure of the mapping module shown in FIG. 22 in accordance with some embodiments.

FIG. 23 is a block diagram illustrating inner structure of the mapping module 219 shown in FIG. 22. As shown in FIG. 23, the mapping module 219 includes a distance determination unit 2191, a margin acquisition unit 2192 and an offset calculation unit 2193. Each unit included in the mapping module 219 can be a sub-module of the mapping module 219, which can be a hardware-based module (e.g., a DSP, a FPGA, etc.), a software-based module (e.g., a module of computer code executed at a processor, a set of processor-readable instructions executed at a processor, etc.), or a combination of hardware and software modules.

The distance determination unit 2191 can be configured to determine geographic distances between each POI from the set of POIs and the user's current location. As described above with respect to FIGS. 14-15, the distance determination unit 2191 can be configured to determine those geographic distances by performing the step 211 of the method 1400.

The margin acquisition unit 2192 can be configured to determine margins between the predefined plane and the user interface of the apparatus. As described above with respect to FIGS. 14-15, the margin acquisition unit 2192 can be configured to determine those margins by performing the step 213 of the method 1400.

The offset calculation unit 2193 can be configured to calculate offset values for each POI from the set of POIs when the POI is mapped to the predefined plane. As described above with respect to FIGS. 14-15, the offset calculation unit 2193 can be configured to calculate the offset values by performing the step 215 of the method 1400.

Returning to FIG. 22, the distribution module 239 can be configured to display symbols representing the set of POIs on the user interface of the apparatus based on the mapping of the set of POIs on the predefined plane that is performed by the mapping module 219. As described above with respect to FIG. 13, the distribution module 239 can be configured to display the symbols representing the set of POIs by performing the step 230 of the method 1300.

Figure 24:
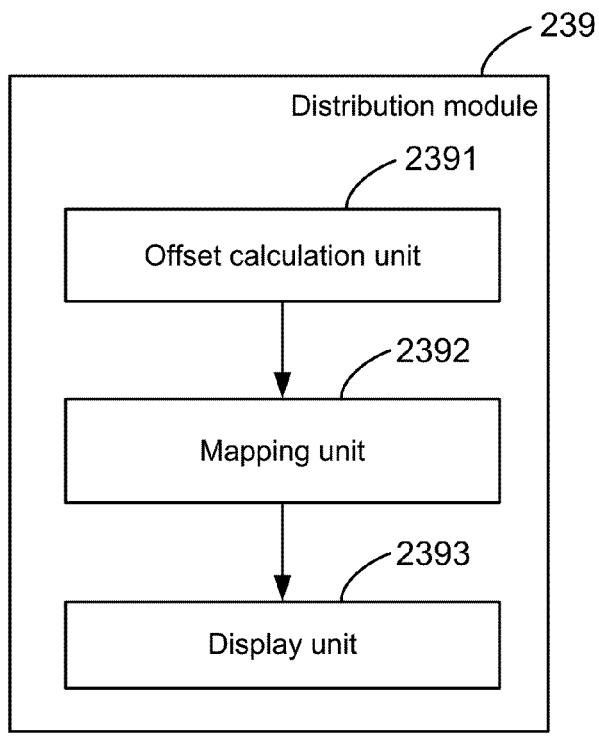
FIG. 24 is a block diagram illustrating inner structure of the distribution module shown in FIG. 22 in accordance with some embodiments.

FIG. 24 is a block diagram illustrating inner structure of the distribution module 239 shown in FIG. 22 in accordance with some embodiments. As shown in FIG. 24, the distribution module 239 includes an offset calculation unit 2391, a mapping unit 2392 and a display unit 2393. Each unit included in the distribution module 239 can be a sub-module of the distribution module 239, which can be a hardware-based module (e.g., a DSP, a FPGA, etc.), a software-based module (e.g., a module of computer code executed at a processor, a set of processor-readable instructions executed at a processor, etc.), or a combination of hardware and software modules.

The offset calculation unit 2391 can be configured to calculate offset values for each POI from the set of POIs. As described above with respect to FIGS. 15-16, the offset calculation unit 2391 can be configured to calculate offset values for the POIs by performing the step 231 of the method 1600.

The mapping unit 2392 can be configured to map each POI from the set of POIs onto the predefined plane associated with the apparatus based on the offset values for that POI. As described above with respect to FIGS. 15-16, the mapping unit 2392 can be configured to map the POIs onto the predefined plane by performing the step 233 of the method 1600.

The display unit 2393 can be configured to display the distribution of the set of POIs in the predefined plane using an azimuthal projection map (e.g., a radar thumbnail) at the user interface of the apparatus. As described above with respect to FIGS. 15-16, the display unit 2393 can be configured to display the distribution of the set of POIs in the predefined plane by performing the step 235 of the method 1600.

Figure 25:
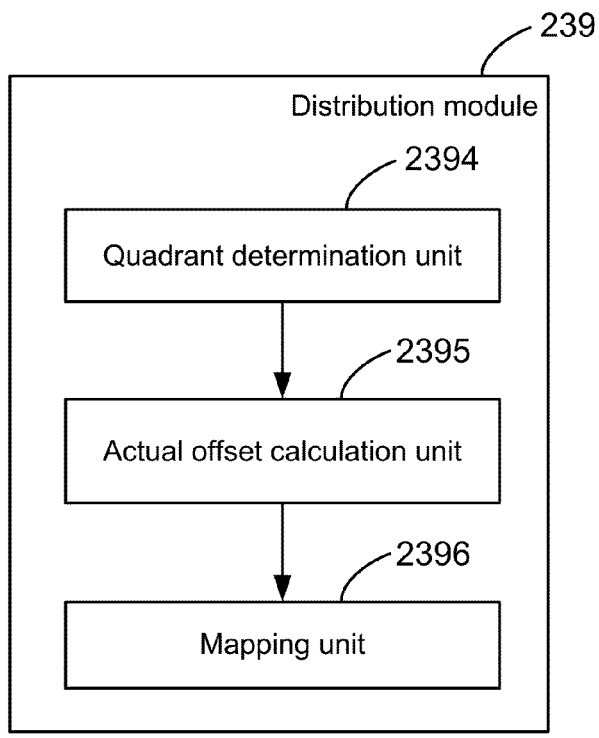
FIG. 25 is a block diagram illustrating inner structure of the distribution module shown in FIG. 22 in accordance with some other embodiments.

FIG. 25 is a block diagram illustrating inner structure of the distribution module 239 shown in FIG. 22 in accordance with some other embodiments. As shown in FIG. 25, the distribution module 239 includes a quadrant determination unit 2394, an actual offset calculation unit 2395 and a mapping unit 2396. In some embodiments, each unit shown in FIG. 25 can be implemented at the distribution module 239 independent with the units shown in FIG. 24. In some embodiments, the units shown in FIGS. 24 and 25 can be implemented in a single distribution module 239.

The quadrant determination unit 2394 can be configured to determine a corresponding quadrant for each POI from the set of POIs that is mapped to outside of the predefined plane associated with the apparatus. As described above with respect to FIGS. 15 and 17, the quadrant determination unit 2394 can be configured to determine the quadrants for those POIs by performing the step 237 of the method 1700.

The actual offset calculation unit 2395 can be configured to determine actual offset values for each POI from the set of POIs that is mapped to outside of the predefined plane based on calculated offset values and offset correction values for that POI, and the quadrant for that POI. As described above with respect to FIGS. 15 and 17, the actual offset calculation unit 2395 can be configured to determine actual offset values for those POIs by performing the step 238 of the method 1700.

The mapping unit 2396 can be configured to map each POI from the set of POIs that has actual offset values onto the predefined plane based on the actual offset values for that POI. As described above with respect to FIGS. 15 and 17, the mapping unit 2396 can be configured to map those POIs onto the predefined plane by performing the step 239 of the method 1700.

Figure 26:
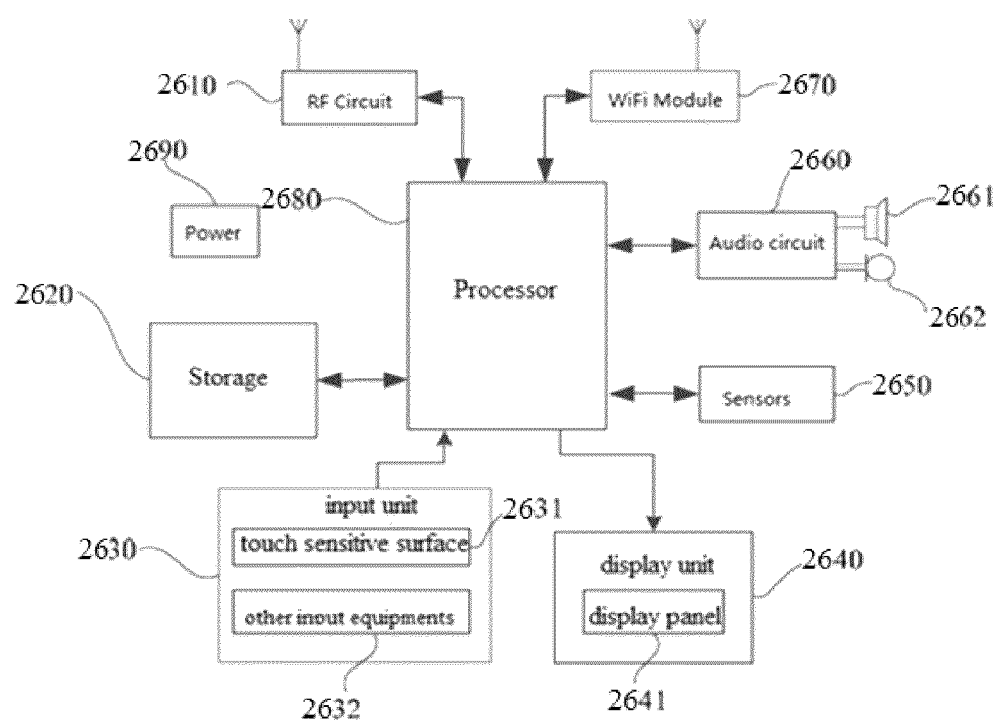
FIG. 26 is a block diagram illustrating structure of a mobile device in accordance with some embodiments.

FIG. 26 is a block diagram illustrating structure of a mobile device in accordance with some embodiments. The mobile device shown in FIG. 26 can be structurally and functionally similar to the mobile device described above with respect to FIG. 1 and the apparatuses shown and described above with respect to FIGS. 19-25. The mobile device can be operatively coupled to (e.g., via a network described above with respect to FIG. 1) and communicate with one or more server devices (e.g., the server device described above with respect to FIG. 1) to provide a location and/or navigation service to a user of the mobile device. Particularly, the mobile device can be configured to perform the methods shown and described above with respect to FIGS. 1-18 for providing location and/or navigation services.

As shown in FIG. 26, the mobile device includes a processor 2680, a storage 2620, an input unit 2630, a display unit 2640, a sensor 2650, an audio circuit 2660, a Wi-Fi (Wireless Fidelity) module 2670, a radio frequency (RF) circuit 2610 and a power supply 2690. In some embodiments, the mobile device can include more or less devices, components and/or modules than those shown in FIG. 26. One skilled in the art understands that the structure of the mobile device shown in FIG. 26 does not constitute a limitation for the mobile device, and may include more or less components than those illustrated in FIG. 26. Furthermore, the components of the mobile device (shown or not shown in FIG. 26) can be combined and/or arranged in different ways other than that shown in FIG. 26.

The RF circuit 2610 is configured to send and receive data, and in particular, to send uplink to data to and/or receive downlink data from a base station (e.g., a server device). The RF circuit 2610 is configured to send the received data to the processor 2680 for further processing. The RF circuit 2610 can include, for example, one more antenna, amplifier, tuner, oscillator, subscriber identity module (SIM) card, transceiver, coupler, low noise amplifier (LNA), duplexer, etc. The RF circuit 2610 is configured to wirelessly communicate with other network or device using any suitable wireless communication protocol such as, for example, GSM, GPRS, CDMA, WCDMA, LTE, etc.

The storage 2620 can be a memory configured to store software programs and/or modules. The processor 2680 can execute various applications and data processing functions included in the software programs and/or modules stored in the storage 2620. The storage 2620 includes, for example, a program storage area and a data storage area. The program storage area is configured to store, for example, an operating system and application programs. The data storage area is configured to store data received and/or generated during the use of the mobile device (e.g., geographic data of a set of POIs retrieved from a server device). The storage 2620 can include one or more high-speed RAM, non-volatile memory such as a disk storage device and a flash memory device, and/or other volatile solid state memory devices. In some embodiments, the storage 2620 also includes a memory controller configured to provide the processor 2680 and the input unit 2630 with access to the storage 2620.

The input unit 2630 is configured to receive input data and signals (e.g., messages) and also generate signals caused by operations and manipulations of input devices such as, for example, a user's finger, a touch pen, a keyboard, a mouse, etc. Specifically, the input unit 2630 includes an image input device 2631 (e.g., a touch screen, a touchpad) and other input devices 2632. The image input device 2631 is configured to collect touch operations on or near the image input device 2631 that are performed by a user of the mobile device, such as operations performed by the user using a finger, stylus, touch pen, or any other suitable object or attachment on or near a touch-sensitive surface of the image input device 2631. In some embodiments, the image input device 2631 can optionally include a touch detection apparatus and a touch controller. The touch detection apparatus can detect the direction of the touch operation and signals generated by the touch operation, and then transmit the signals to the touch controller. The touch controller can receive the signals from the touch detection apparatus, convert the signals into contact coordinate data, and then send the contact coordinate data to the processor 2680. The touch controller can also receive and execute commands received from the processor 2680. The image input device 2631 can be implemented using various types of technologies such as, for example, resistive touch screen, capacitive touch screen, infrared ray touch screen, surface acoustic wave (SAW) touch screen, etc. The other input devices 2632 can include, for example, a physical keyboard, a function key (such as a volume control key, a switch key, etc.), a trackball, a mouse, a joystick, etc.

The display unit 2640 is configured to display information (e.g., textual messages) entered by the user and/or received from the server device on various graphical user interfaces (GUIs) of the mobile device. The GUIs can include, for example, graph, text, icon, video, and/or any combination of them. The display unit 2640 includes a display panel 2641, which can be, for example, a LCD, a LED, organic light-emitting diode (OLED) display, etc. Furthermore, the image input device 2631 can cover the display panel 2641. After a touch operation on or near the image input device 2631 is detected, the image input device 2631 transmits information of the touch operation to the processor 2680, where the type and/or other information of the touch operation are determined. The processor 2680 sends visual information to the display panel 2641 based on the determined type of the touch operation. The visual information is then displayed on the display panel 2641. Although shown in FIG. 26 as two separate components for the input and output functions respectively, in other embodiments, the image input device 2631 and the display panel 2641 can be integrated into one component for realization of the input and output functions.

The mobile device includes at least one sensor 2650 such as, for example, a light sensor, a motion sensor, and/or other types of sensors. A light sensor can be, for example, an ambient light sensor or a proximity sensor. The ambient light sensor is configured to adjust the brightness of the display panel 2641 according to the light intensity received at the ambient light sensor. The proximity sensor is configured to turn off the display panel 2641 and/or backlight when, for example, the mobile device moves near the user's ear. A motion sensor can be, for example, an acceleration transducer that can measure acceleration at each direction (e.g., 3-axis directions), measure the magnitude and direction of gravity when stationary, be used in applications for recognition of the posture of the mobile device (e.g., horizontal and vertical screen switching, games, magnetometer posture calibration), be used in applications related to vibration recognition (e.g., pedometer, percussion), and/or the like. Additionally, although not shown in FIG. 26, the mobile device can also include other sensory devices such as, for example, a gyroscope, a barometer, a hygrometer, a thermometer, an infrared sensor, and/or the like.

The audio circuit 2660, the speaker 2661 and the microphone 2662 collectively provide an audio interface between the user and the mobile device. The audio circuit 2660 transmits an electric signal converted from audio data to the speaker 2661, where the electric signal is converted and output as an acoustical signal by the speaker 2661. The microphone 2662 converts a collected acoustical signal into an electric signal, which is then sent to and converted to audio data by the audio circuit 2660. The audio data is sent to the processor 2680 for further processing, and then sent to another terminal device through the RF circuit 2610 or stored in the storage 2620 for further processing. The audio circuit 2660 can also include an earplug jack to enable communication between a peripheral headset and the mobile device. In some embodiments, a speech message spoken by the user can be received through the microphone 2662 and the audio circuit 2660. Similarly, a speech message received from the server device can be played using the speaker 2661 and the audio circuit 2660.

The Wi-Fi module 2670 is configured to enable Wi-Fi communication between the mobile device and other devices or network. For example, the Wi-Fi module 2670 provides the user with a wireless access to broadband Internet. As a result, the user can use the Wi-Fi connection to, for example, send and receive E-mails, browse web pages, access streaming media, and so on. Although shown in FIG. 26 as including the Wi-Fi module 2670, in some other embodiments, a mobile device can operate without such a Wi-Fi module or the Wi-Fi functionality.

The processor 2680 functions as a control center of the mobile device. The processor 2680 is configured to operatively connect each component of the mobile device using various interfaces and circuits. The processor 2680 is configured to execute the various functions of the mobile device and to perform data processing by operating and/or executing the software programs and/or modules stored in the storage 2620 and using the data stored in the storage 2620. In some embodiments, the processor 2680 can include one or more processing cores. In some embodiments, an application processor and a modem processor can be integrated at the processor 2680. The application processor is configured to monitor and control the operating system, user interfaces, application programs, and so on. The modem processor is configured to control wireless communication.

The power supply 2690 is used to provide power for the various components of the mobile device. The power supply 2690 can be, for example, a battery. The power supply 2690 can be operatively coupled to the processor 2680 via a power management system that controls charging, discharging, power consumption, and/or other functions related to power management. In some embodiments, the power supply 2690 can include one or more DC and/or AC power source, recharging system, power failure detection circuit, power converter or inverter, power supply status indicator, and/or the like.

The foregoing description, for purpose of explanation, has been described with reference to specific embodiments. However, the illustrative discussions above are not intended to be exhaustive or to limit the present application to the precise forms disclosed. Many modifications and variations are possible in view of the above teachings. The embodiments were chosen and described in order to best explain the principles of the present application and its practical applications, to thereby enable others skilled in the art to best utilize the present application and various embodiments with various modifications as are suited to the particular use contemplated.

While particular embodiments are described above, it will be understood it is not intended to limit the present application to these particular embodiments. On the contrary, the present application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

What is claimed is:

1. A method of providing navigation assistance, comprising:
    at a mobile device having one or more processors and memory for storing programs to be executed by the one or more processors:
        storing respective geographic positions for a set of points of interest (POIs);
        while storing the respective geographic positions of the set of POIs, determining a current location and a current viewing direction of the mobile device;
        based on the stored geographic positions and the current location and viewing direction of the mobile device, identifying, from the set of POIs, a subset of POIs within a current field of view associated with the mobile device; and mapping the current location of the mobile device and the respective geographic positions of the subset of POIs onto a user interface displayed on the mobile device, further including mapping each POI from the subset of POIs to a respective position on the user interface based at least in part on the current location of the mobile device, the respective geographic position of the POI, and a maximum distance between two POIs from the subset of POIs.

2. The method of claim 1, further comprising:

retrieving, from a server device, the respective geographic positions for the set of POIs prior to determining the current location and the current viewing direction of the mobile device.

3. The method of claim 2, wherein retrieving the respective geographic positions further comprises:

retrieving, from the server device, the respective geographic positions for the set of POIs in textual form without any accompanying map image.

4. The method of claim 1, wherein mapping the current location of the mobile device and the respective geographic positions of the subset of POIs onto the user interface displayed on the mobile device further comprises:

presenting respective symbols for the subset of POIs and a respective symbol for the mobile device on a map displayed on the mobile device, wherein a relative distance between the respective symbol for each POI from the subset of POIs and the respective symbol for the mobile device shown on the map is based at least on the respective geographic position of that POI and the current location of the mobile device.

5. The method of claim 4, wherein the relative distance between the respective symbol for each POI from the subset of POIs and the respective symbol for the mobile device shown on the map is further based at least on an aspect ratio of a display pixel of the mobile device.

6. The method of claim 1, wherein identifying the subset of POIs within the current field of view associated with the mobile device further comprises:

obtaining an angular range for the current field of view associated with the mobile device based at least in part on the current location and the current viewing direction of the mobile device;

calculating a respective azimuth angle for each POI in the set of POIs based on the current location of the mobile device and the respective geographic position of said each POI; and determining, based at least in part on the respective azimuth angle of said each POI, whether said each POI is within the current field of view associated with the mobile device.

7. The method of claim 1, wherein mapping the current location of the mobile device and the respective geographic positions of the subset of POIs onto the user interface displayed on the mobile device further comprises:

calculating, based on the respective geographic position of each POI from the subset of POIs and the current location of the mobile device, a respective vertical pixel offset and a respective horizontal pixel offset between a symbol representing said each POI displayed on the user interface and a symbol representing the mobile device displayed on the user interface.

8. The method of claim 1, further comprising:

detecting a change in at least one of the current location and the current viewing direction of the mobile device;

identifying an updated subset of POIs based at least in part on the stored geographic positions of the set of POIs and at least one of an updated current location and an updated current viewing direction of the mobile device; and mapping the updated current location of the mobile device and the respective geographic positions of the updated subset of POIs onto the user interface displayed on the mobile device.

9. The method of claim 1, wherein mapping the current location of the mobile device and the respective geographic positions of the subset of POIs onto the user interface displayed on the mobile device further comprises:

concurrently presenting a first map and a second map on the user interface of the mobile device, the first map including respective symbols for the subset of POIs and a respective symbol for the current location of the mobile device, and the second map including a respective symbol of at least one POI from the set of POIs that is not included in the subset of POIs and not represented by any symbol displayed on the first map.

10. The method of claim 9, wherein the first map is a cylindrical projection map, and the second map is an azimuthal projection map.

11. The method of claim 10, wherein each POI from the set of POIs is represented by a respective symbol in the second map.

12. The method of claim 9, wherein the second map is an azimuthal projection map with the respective symbol for the current location of the mobile device at the center of the azimuthal projection map.

13. The method of claim 9, further comprising:

visually representing the current field of view associated with the mobile device in at least one of the first and second maps.

14. The method of claim 1, wherein identifying the subset of POIs within the current field of view associated with the mobile device from the set of POIs further includes identifying the subset of POIs further based at least in part on a first POI category selected by a user of the mobile device.

15. The method of claim 14, further comprising:

receiving user input selecting a second POI category different from the first POI category;

identifying an updated subset of POIs from the set of POIs based at least in part on the second POI category; and mapping the current location of the mobile device and the respective geographic positions of the updated subset of POIs onto the user interface displayed on the mobile device.

16. A mobile device, comprising:

one or more processors; and memory storing one or more programs to be executed by the one or more processors, the one or more programs comprising instructions for:

storing respective geographic positions for a set of points of interest (POIs);

while storing the respective geographic positions of the set of POIs, determining a current location and a current viewing direction of the mobile device;

based on the stored geographic positions and the current location and viewing direction of the mobile device, identifying, from the set of POIs, a subset of POIs within a current field of view associated with the mobile device; and mapping the current location of the mobile device and the respective geographic positions of the subset of POIs onto a user interface displayed on the mobile device, further including mapping each POI from the subset of POIs to a respective position on the user interface based at least in part on the current location of the mobile device, the respective geographic position of the POI, and a maximum distance between two POIs from the subset of POIs.

17. The mobile device of claim 16, wherein the one or more programs further comprises instructions for:
retrieving, from a server device, the respective geographic positions for the set of POIs prior to determining the current location and the current viewing direction of the mobile device.

18. A non-transitory computer readable storage medium storing one or more programs, the one or more programs comprising instructions, which, when executed by one or more processors, cause the processors to perform operations comprising: at a mobile device:
storing respective geographic positions for a set of points of interest (POIs);
while storing the respective geographic positions of the set of POIs, determining a current location and a current viewing direction of the mobile device;
based on the stored geographic positions and the current location and viewing direction of the mobile device, identifying, from the set of POIs, a subset of POIs within a current field of view associated with the mobile device; and
mapping the current location of the mobile device and the respective geographic positions of the subset of POIs onto a user interface displayed on the mobile device, further including mapping each POI from the subset of POIs to a respective position on the user interface based at least in part on the current location of the mobile device, the respective geographic position of the POI, and a maximum distance between two POIs from the subset of POIs.

19. The non-transitory computer readable storage medium of claim 18, wherein the operations further comprises:
retrieving, from a server device, the respective geographic positions for the set of POIs in textual form without any accompanying map image.

\* \* \* \* \*